United States Patent [19]

Levecque et al.

[11] 4,230,471
[45] Oct. 28, 1980

[54] SUPPRESSION OF POLLUTION IN MINERAL FIBER MANUFACTURE

[75] Inventors: Marcel Levecque, Birchrunville, Pa.; Jean A. Battigelli, Rantigny, France

[73] Assignee: Saint-Gobain Industries, Neuilly-sur-Seine, France

[21] Appl. No.: 923,151

[22] Filed: Jul. 10, 1978

Related U.S. Application Data

[63] Continuation of Ser. No. 747,433, Dec. 3, 1976, Pat. No. 4,105,424, which is a continuation-in-part of Ser. No. 456,878, Apr. 1, 1974, abandoned, No. 557,281, Mar. 11, 1975, Pat. No. 4,052,183, which is a continuation-in-part of Ser. No. 353,983, Apr. 24, 1973, Pat. No. 3,874,886.

[30] Foreign Application Priority Data

| Mar. 30, 1973 [FR] | France | 73 11525 |
| Oct. 10, 1973 [FR] | France | 73.36169 |
| Feb. 10, 1975 [FR] | France | 75 04039 |
| Oct. 22, 1976 [FR] | France | 76 31860 |

[51] Int. Cl.² .................................... C03B 37/02
[52] U.S. Cl. ........................... 65/2; 65/3 C; 65/5; 65/9; 65/16; 264/12; 425/7
[58] Field of Search ............... 65/2, 5, 16, 3 C, 4 R, 65/9; 425/7; 264/12

[56] References Cited

U.S. PATENT DOCUMENTS

| 3,125,485 | 3/1964 | Constantine et al. | 65/9 X |
| 3,356,565 | 12/1967 | Smucker et al. | 65/3 C X |
| 3,596,319 | 8/1971 | McKenica et al. | 65/9 X |
| 3,762,896 | 10/1973 | Borst | 65/3 C |
| 3,791,807 | 2/1974 | Etzel et al. | 65/3 C |
| 4,105,424 | 8/1978 | Levecque et al. | 65/5 |

Primary Examiner—Robert L. Lindsay, Jr.
Attorney, Agent, or Firm—John T. Synnestvedt; Kenneth P. Synnestvedt

[57] ABSTRACT

Methods and equipment are disclosed for production of mineral fibers, by attenuation, involving the use of a substantial volume of gas, in which water is also employed at least in a fiber binder, the methods and equipment providing for recirculation of most of the gases, and preferably also of the water employed in the system. Both the gases and the water are purified and the pollutants are separated and are also treated to convert the pollutant constituents to a form not ecologically objectionable for disposal. The methods and equipment also minimize discharge of fluids and aural efflux from the plant. Methods and apparatus are also disclosed for controlling and stabilizing various operating conditions of the fiberization; such as the temperature and the pressure in the fiber forming section or chamber.

3 Claims, 18 Drawing Figures

FIG. 16

SUPPRESSION OF POLLUTION IN MINERAL FIBER MANUFACTURE

CROSS REFERENCES

This application is a continuation of application Ser. No. 747,433, filed Dec. 3, 1976, issued as U.S. Pat. No. 4,105,424, which in turn is a continuation-in-part of application Ser. No. 456,878, filed Apr. 1, 1974, now abandoned, and of Ser. No. 557,281, filed Mar. 11, 1975, issued as U.S. Pat. No. 4,052,183, which latter application is a continuation-in-part of application Ser. No. 353,983, filed Apr. 24, 1973 and issued on Apr. 1, 1975, as U.S. Pat. No. 3,874,886.

Attention is also called to the fact that said application Ser. No. 353,983 discloses subject matter in common with application Ser. No. 353,984, filed Apr. 24, 1973, by the present applicants jointly with another, said application Ser. No. 353,984 having issued on May 27, 1975 as U.S. Pat. No. 3,885,940. Attention is further directed to the fact that the present application also discloses subject matter in common with the companion application Ser. No. 655,503, filed Feb. 5, 1976, as a Continuation of application Ser. No. 511,500, filed Oct. 2, 1974, by the present applicant Jean A. Battigelli and one Marie-Pierre Barthe.

The omission of claims from the present application directed to any features herein disclosed is not to be understood as an abandonment of that subject matter, because such features are claimed in companion applications.

BACKGROUND AND STATEMENT OF OBJECTS

The present invention is concerned with a process, and the devices for implementing it, which assures the suppression of harmful factors and permits the elimination of at least the majority of the ecologically objectionable pollutant elements—noxious or undesirable due to their toxicity, their odor, and their opaqueness—contained in the gas or liquid wastes discarded by installations manufacturing mineral fibers, and which also assures reduction of the noise produced by these same installations.

The invention is concerned with installations for the manufacturing of fiber blanket, mat padding, or boards of mineral fibers and especially glass, agglomerated by thermosetting or thermoplastic binders, which coat the fibers and/or bring about close binding between fibers in the finished product.

The binders commonly used in this type of manufacturing have a base consisting of pure or modified phenoplast or aminoplast resins, since these present advantageous characteristics for the manufacturing of agglomerated fibrous products. They are thermohardenable, soluble or emulsifiable in water, they adhere well to the fibers, and are relatively low in cost.

Generally, these binding agents are used dissolved or dispersed in water to which certain ingredients are added, in order to form the binder which is sprayed on the fibers.

Under the effect of the heat to which they are subjected during the fiber products manufacturing processes, these binders release toxic volatile elements having a perceptible pungent odor even at very weak concentrations, such as phenol, formaldehyde, urea, ammonia, and decomposition products of organic materials.

Other binders are used for certain applications due to their very low cost. Certain extracts of natural products are hardened by drying and cross linking, such as occurs with linseed oil upon oxidation. Others are thermoplastic, as for example bitumen. During the fiber binding process, they are all, at least to some extent, increased in temperature and to a temperature sufficient to cause the release of volatile elements, noxious or otherwise undesirable, among other reasons, due to their odor.

In the text below, the word "binder" will be used to designate any one or all of the binding products mentioned above, whether they are used in liquid form, dissolved or suspended in water or in other liquid, or in an emulsion.

The invention relates to that part of the installation for manufacturing agglomerated fibrous materials called the fiber collecting or forming section, which is situated immediately after the fiber production apparatus, and in which the following operations are carried out primarily:

the conveying of the fibers from the fiber production apparatus to the mat or blanket forming equipment;

the application of the binder to the fibers, the binder generally incorporating pollutant elements;

the formation of the blanket on the fiber collecting device, for which purpose the collecting device generally consists of a perforated belt;

the cooling of the fibers and of the gases used for attenuating or guiding the fibers, such cooling generally being accomplished by air induced by the gases;

the separation of the fibers from the gases and induced air by suction these fluids through the blanket being formed; and the evacuation outside of the installation of all the elements not retained by the fiber blanket or the mat being made.

It is in the fiber collecting or forming section that large quantities of gases and water have contact with the binder which contains the pollutant elements, and are contaminated according to a pollution process which is common to all known processes for the manufacture of blankets, mats, or boards of fibers agglomerated by a binder, and which will now be described.

(a) The pollution of the gaseous effluents takes place according to the following process:

The binder is projected into the current made up of fibers and gases, coming from the fiber production apparatus, the binder being present in the form of clouds of fine droplets. Some of this binder is entrapped by the fibers, some is unavoidably deposited on the walls of the installation, and finally some is found in the gases or fumes in the form of fine droplets and in the form of vapor.

Thus two fluid contamination modes coexist, the one consisting of contamination by droplets of the binder and the other consisting of contamination by vapors of the binder. In the binder application, the binder atomization or dispersion devices used furnish particles or droplets within a very wide range of diameters. The finest droplets are not entrapped by the fibers and are drawn through the blanket being formed by the gaseous current, in which they are present in suspension.

The droplets of binder deposited on the fibers during the binder application are subjected to the kinetic effects of the gaseous current passing through the blanket being formed. A large quantity of droplets is extracted from the fibers, migrates through the blanket, and is found in suspension in the exhausted gases.

Finally, the desire to obtain a homogeneous distribution of the binder in the blanket makes it necessary to disperse the binder in the fiber and gaseous current in an area situated near the fiber production apparatus, where this current still has a well-defined geometric form but where its temperature may still be high enough so that some of the binder, or at least its most volatile components, are evaporated. These pollutant vapors mix with the gases and contaminate them.

In the text below, the word "fumes" will be used to designate the gaseous effluents which pass through the fiber blanket and are evacuated outside of the collecting unit, i.e., the gases used for attenuating or guiding the fibers, the fluids induced by these gases, and the pollutant elements in the form of droplets or vapor suspended in these fluids. It is to be understood that various features of the invention, such as treatment steps and components of the apparatus, may be employed with "fumes" having a wide range of compositions and pollutants. It is preferred to treat all components of such fumes, but various features of the invention may also be employed with gases originating in fiber production operations in which the gases have pollutant components, whether or not the pollutants have their origins in fiber binders.

(b) The functions performed by the water in a fiber collecting unit make a large degree of pollution inevitable in any installation in which binders are used.

In operation, water is used:

(1) to dilute and carry the binder when the latter is used in liquid form;

(2) to wash or scrub the fumes, an operation which consists:

(2a) of causing the largest possible amount of pollutants contained in the fumes in the form of droplets or vapor to be captured by the droplets of the scrubbing water, thus causing the pollutant charge of the fumes to be transferred to the wash water;

(2b) of capturing and entraining on the walls of the collecting unit the fibers suspended in the fumes;

(3) to wash the different parts of the collecting installation (perforated belt, fume flues, etc.) in order to evacuate the binder and the fibers deposited therein.

During these operations the wash water is charged with binder components which are soluble, insoluble, or in the vapor state, and the concentration of pollutant elements may reach high values.

The foregoing description of the manner in which the fumes and the water are contaminated is based on an interpretation of measurements and observations made in actual manufacturing installations.

Data derived from such measurement and observation is herein given by way of information; but it will be understood that other data and explanations may be found and that the invention is not limited by the data given.

In all installations for the manufacturing of agglomerated fibrous products, regardless of the fiberization process used, the effluent pollution described above involves considerable quantities of effluents.

In installations equipped with devices for attenuating fibers by blowing, in which the material to be attenuated is transformed into fibers by means of high-energy jets, the quantities of fumes discharged into the atmosphere are—for the best known processes—on the order of magnitude of the following values:

100 $Nm^3$ per kilo of fibers for the process described in the Slayter U.S. Pat. No. 2,133,236;

300 $Nm^3$ per kilo of fibers for the AEROCOR process (Stalego U.S. Pat. No. 2,489,243);

70 $Nm^3$ per kilo of fibers for the SUPERTEL process (Levecque French Pat. No. 1,124,489 and U.S. Pat. Nos. 3,114,618 and 3,285,723);

which, for large production plants, leads to outputs ranging from 500,000 to 1,000,000 $Nm^3$/hr. (In these values, $Nm^3$ refers to the cubic meter volume at standard atmospheric pressure and room temperature.)

In installations equipped with fiber attenuating devices, in which the material to be attenuated is transformed into fibers under the effect of mechanical forces—centrifugal for example—and where a gaseous current is only used as a medium (generally flowing in an essentially horizontal direction, see FIG. 14, for example) for carrying the fibers produced towards the collecting device—the quantity of fumes given off is a little less, but nevertheless very important: for example, 30 Nm3 per kilo of fibers, for the process described in Powell U.S. Pat. No. 2,577,431, which for a production plant results in outputs on the order of 300,000 to 400,000 $Nm^3$/hr.

The quantities of polluted water are pretty much the same for all processes, and on the order of 1,000 $m^3$/hr. or more for large industrial installations.

The volume of these quantities of polluted effluent has led legislatures first to limit the concentration of phenol compounds in the effluents discarded in the atmosphere, and later to prohibit discarding of any pollutants, at least in certain countries.

Furthermore, limitations concerning the odors or the opaqueness of discharged effluents have been established in various countries.

In addition, installations for the manufacture of agglomerated fibrous products also tend to pollute in another respect. In addition to toxic or pungent-smelling products, these installations discard substantial quantities of steam, on the order of 20 to 30 metric tons per hour for large plants, which steam escapes from stacks in very opaque plumes.

Noise is another type of nuisance created by installations for the manufacturing of agglomerated fibrous products. In these installations, the noise is essentially emitted by two sound sources—the apparatus for producing the fibers and the fan for extracting the fumes.

Actually, all the equipment for producing fibers mounted in these installations uses jets of gases at high speed either for transforming the material to be drawn or attenuated into fibers or for directing the fibers produced. It is known that the acoustic power level emitted by these jets considerably increases with the speed of the jets. This level may exceed 100 decibels adjacent to the fiber production apparatus, where the operators are required to work. This level is much higher than the level tolerated by industrial regulations in many countries.

Furthermore, the acoustic power developed by the fume extraction fan is transmitted along the flues connecting with the fume exhaust stack. The latter is ordinarily situated outside the buildings, where it functions as an antenna, and radiates this acoustic power into the surrounding environment. The inconvenience resulting for the vicinity has caused authorities in different countries to order the shut-down of certain installations.

The need to reduce or eliminate the pollution produced—and this at costs low enough not to overly influence the cost price of the finished product—is pressing. Numerous investigations have been carried out on this problem, and certain solutions have been developed.

The process according to the invention is characterized by the fact that the fumes (as hereinabove defined) are partially recycled, so as to cause them repeatedly to traverse the blanket or mat being formed. The process according to the invention is also characterized by the fact that the majority of the heat contributed by the gases coming from the fiber production apparatus and the attenuated fibrous material is transferred to the wash water, by the fact that the wash water is cooled, by the fact that the fumes are washed in water after they have traversed the blanket or mat and the fiber collecting device in order to transfer to the water some of the pollutant products contained in these fumes, by the fact that the non-recycled part of the said fumes is purified before evacuation into the atmosphere, by the fact that at least some of the wash water is recycled—a certain quantity of which has been subjected to a treatment for extracting at least a sizable fraction of the pollutant products contained in the wash water—and by the fact that the solid wastes are subjected to a purification treatment before final disposal.

The foregoing process effects cooling of the recirculation gases, which is important in making possible such recirculation. In combination with such cooling of the recirculating gases, it is preferred also to spray water on the current of fibers and gases in the receiving chamber, in order to cool the fiber and gas current. Such water spraying, with resultant cooling of the current, together with the cooling of the recirculating gases provides for reduction of the temperatures of the current notwithstanding the substantial absence of induction of ambient air by the attenuating blast.

According to a particularly important characteristic of the invention, the quantity of fumes discarded into the atmosphere is essentially equal to the quantity of gases flowing from the attenuating device.

The invention is particularly concerned with recycling the majority of the fumes in the installation, and with treating and evacuating only a small portion of the fumes—it being possible for the recycled portion to reach at least 95% of the total quantity of fumes ordinarily evacuated into the atmosphere. The quantity of fumes to be purified before discarding may thus be less than 5% of all of the fumes, which even makes it practicable to use costly purification treatment, whose effectiveness is total—as for example burning—without prohibitive energy expenditures.

Another object of the invention is to render insoluble the thermohardenable resins contained in the water. These resins are rendered insoluble, according to the invention, by means of a heat treatment—preferably at a temperature greater than 100° C., and more advantageously ranging between approximately 150° and 240° C., and under pressure.

The application of the above process (for rendering resins insoluble) to at least some of the cooling and washing water is advantageously used to render insoluble the dissolved binder components contained in the water, in order to subsequently be able—by means of known techniques—to extract insoluble materials and thus to maintain the concentrations of the pollutant constituents in the washing and cooling waters at a level compatible with the continuous re-utilization of these waters in the installation. The wash water thus circulates in a closed circuit and any external rejection of pollutants with the wash water is eliminated.

Another object of the invention consists of a heat treatment to which the wash water is subjected—a treatment which consists of vaporizing it and of heating this vapor to a temperature sufficient so that the pollutant constituents are transformed into non-pollutant constituents.

The invention also is concerned with means for sound insulation—adjusted to the particular configurations shown—to the devices for conveying and guiding the recycled fumes, in order to reduce the noise emitted by these devices, and with a particular arrangement of the apparatus for evacuating the non-recycled fumes into the atmosphere, which reduces the noise emitted by this apparatus in the surrounding environment.

In addition to the general objectives above referred to the present invention also contemplates certain controls for the operating conditions, as pointed out just below.

In techniques of the kind briefly referred to above and described in detail hereinafter, the use of the various means for suppression of pollution, especially the recirculation of the current of the attenuating gas and also the separation of the pollutants from the recirculating gas, as by means of a water spray, may at times tend to introduce undesirable fluctuations in the conditions under which the fibers are formed or attenuated, and the condition under which the fiber blanket is formed. Because of the recirculation of a large part of the gases, it is desirable to more completely enclose the forming section, than has been customary where the suppression of pollution by recirculation of the gases is not contemplated. With the more tightly enclosed forming section and where recirculation of gases is employed for the purpose of suppression of pollution, there may be tendencies for fluctuation of both the pressure and the temperature of the gas in the forming section. The pressure will vary in accordance with the quantity of the gases which are diverted and discharged from the recirculation flow path; and in addition, the temperature will vary in accordance with a number of factors including not only the quantity of gas diversion and discharge from the recirculation flow path, but also the extent of water spraying utilized for separation of pollutants from the recirculation gases, as well as the temperature of the water used for such water spraying. Still further, variation in atmospheric conditions, for example as between summer and winter, may also influence the operating conditions with respect to both pressure and temperature.

Variable factors such as those just referred to tend to alter uniformity of fiber and fiber blanket production, particularly in the fiber formation by gas blast attenuation, since uniformity of the fibers depends in part upon uniformity of the conditions of temperature and pressure. In fact, if the temperature of the gaseous current and consequently of the fiber blanket is too high, polymerization of the binder will start prematurely, i.e., in for forming section, instead of awaiting feed of the blanket into the binder curing oven. This condition tends to reduce the mechanical properties of the products, particular their resilience.

On the other hand if the temperature of the gases and consequently that of the blanket is too low, the moisture carried by the blanket increases, and this reduces the efficiency of the curing oven, and can even lead to dimensional irregularities of the manufactured products.

Pressure variations tend to adversely influence the effectiveness of the devices used to reduce the pollution in the gases discharged through the stack. A negative pressure in the formation chamber, that is a pressure below atmospheric pressure will increase the quantity of the air penetrating into the forming section and consequently the quantity of gases to be diverted from the recirculation path and discharged. This results in an increase in the quantity of pollutants ejected into the atmosphere. A positive pressure, on the other hand, leads to leakage or discharge from the formation chamber of gases not yet treated, thereby impairing the intended suppression of pollution.

With the foregoing in mind it is contemplated according to the present invention that controls be provided for maintaining substantial uniformity of the conditions prevailing in the zones of fiber attenuation and fiber blanket formation, particularly uniformity of pressure and temperature of the gases in these zones. In addition, it is further contemplated to regulate the volume of the gas in circulation.

It is also contemplated according to the present invention that the controls for temperature and pressure be adjustable in order to establish the desired pressure and temperature levels.

Other objects and advantages of the invention, including in particular numerous specific advantages for the recycling of fumes, will be given and explained more completely below.

BRIEF DESCRIPTION OF DRAWINGS

The drawings illustrate several preferred embodiments of the invention, all of the figures being at least in part diagrammatic and in general showing elevational or vertical sectional views.

FIG. 16 is a view similar to FIG. 1 but illustrating another embodiment of the pressure control system.

FIG. 18 schematically illustrates still another embodiment of controls according to the invention, in this instance as applied to a fiberization installation of the kind disclosed in application Ser. No. 557,281 above referred to.

Figure 1:
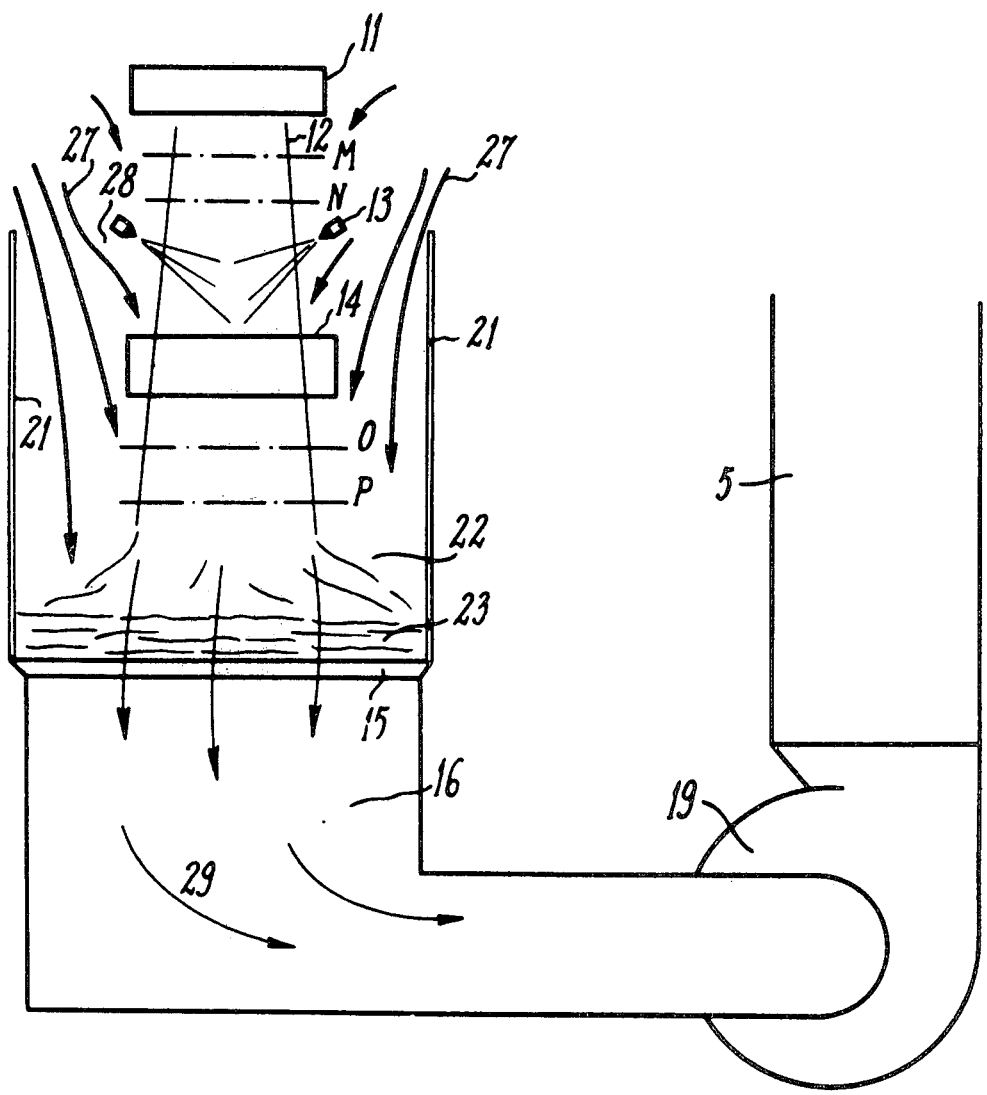
FIG. 1 illustrates a conventional fiber collection installation of a type to which the present invention is applicable.

OPERATING CONDITIONS OF FIBERIZING INSTALLATIONS:

FIG. 1 shows a fiber collection installation of known type to which the invention may be applied. This installation comprises a fiber production device, represented by 11, of a known type such as is ordinarily used in installations for the manufacturing of agglomerated or bonded fibrous panels or boards, in which the material to be attenuated is subjected to the action of a centrifugal or aerodynamic force, or to a combination of the two. The aerodynamic force is applied to the material to be attenuated or to the fibers by means of gaseous jets which are generally at a high temperature and high speed. An example of such equipment is shown in Levecque U.S. Pat. No. 3,285,723. The fibers produced leave device 11, dispersed in a current 12 of fluids generally in the gaseous state formed by high-energy jets and the air or other gases which they induce from the surrounding medium, a current which envelops the fibers and directs them, in the form of a stream with fairly well-defined contours, towards the collection device.

The equipment further includes a zone for application of binder, placed in the path of the fiber and gas current, between the fiber production device 11 and the collection device, in which atomizers 13 disperse the binder, in the state of a cloud made up of fine droplets, into the fiber and gas current. A large proportion of these droplets intercepts the fibers and clings to them, the remainder being present in suspension in the gases accompanying the fibers either in the form of droplets or in the form of vapors.

A fiber distribution device which may be any one of severaknown types, indicated diagrammatically at 14, placed in the path of the fibers and the gases 12, either between the production device 11 and the binder application zone or between the binder application zone and the forming section, as is shown in FIG. 1, which by imparting an oscillating movement to the current of fibers and gas or by deforming this current, makes it possible to distribute the fibers on the collection surface so as to form a blanket whose weight per unit of area is essentially uniform.

The collection surface is provided by an endless perforated belt 15, on which the fibers accumulate to form the blanket 23.

A chamber 16, placed beneath the perforated belt, in the area where the fibers are deposited and the blanket or mat is formed, i.e. the forming zone or section, and in which a pressure reduction or negative pressure created by a fan 19 causes all of the gases accompanying the fibers along their path between production device 11 and perforated belt 15 to traverse the blanket being formed, so that no fluid in the gaseous state is entrained with the fibers, outside of the area where the blanket is formed.

Vertical walls 21, which extend from the perforated belt 15 to a level near the fiber production device 11, and which mark off the area where the blanket is formed, define a section or chamber 22, surrounding the current of fibers and gas, open at its upper end, in an area near the fiber production device. This is commonly designated as the forming "hood".

A fan 19, provides a negative pressure in chamber 16 sufficient to force all of the gases accompanying the fibers (as they are being deposited in the forming section) through the blanket being formed, and evacuates the fumes to the atmosphere through stack 5.

It has already been mentioned that the quantities of fumes to be evacuated from a forming section of the type described above are considerable. In effect, in the fiber production devices of these installations, the drawing and attenuation of the material to be fiberized, or the guiding of this material, or the guiding of the fibers, is achieved by gaseous jets, which have a very high output and speed.

This speed, which is generally greater than 100 meters per second, is desirable for the formation of the fibers but is much greater than the speed necessary—in order to form an appropriate blanket—as the fibers and gases arrive at the perforated belt 15, which latter in general need not exceed 10 meters per second. In fact, it is necessary to substantially slow down the jets coming from the fiber production device. This is achieved by transferring some of the momentum of these jets to the ambient fluid in which they flow. Portions of the ambient fluid are induced and accelerated in the direction of the jets, and mixed with the jets. It is this mixture of jets from the fiber production device and the induced fluid which constitutes the gas current accompanying the fibers.

The induction of surrounding fluid by the jets coming from the fiber production device is a well-known phenomenon characteristic of any jet flowing in the open air, or in a chamber containing a fluid. Fluid mechanics teaches us in effect that such a jet induces important quantities of surrounding gas, and that these quantities of induced gas flow increase with the output of the jet and the length of its course in the ambient gas. However, since the induction phenomenon is a progressive phenomenon, the drop in speed of the inducing jet is only significant after this jet has traveled a sufficient distance through the ambient gas.

In installations of the type described above, in order to provide a speed of the current of fibers and accompanying gases, upon arrival at the collection belt 15, equal to the value given above (on the order of or less than 10 meters per second), the length of the path followed by this current from the fiber production device 11 to the belt 15 is generally greater than 2 or 3 meters, and the quantities of gases which the jets from the production device 11 have induced in this distance, and which traverse the belt 15, are at least equal to 10 or 20 times the quantity of gases constituting the jets issuing from the fiber production device 11.

In addition to the slowing down which must be imparted to the current of fibers and accompanying gears, in order that the blanket be formed under good conditions, it is necessary that the flow directions of the fibers and the gases be parallel and oriented in the general direction of flow from the fiber production device to halt 15.

In order to furthr explain the matter, the current or stream 12 of fibers and accompanying gases may be divided in segments, limited by sections perpendicular to the direction of flow, i.e., sections lying between lines M, N, O, and p.

In any segment such as that marked off by section lines M and N for example, the stream maintains a well-determined direction and undergoes a well-determined loss of speed.

These two factors—direction and reduction in speed—will have the desired characteristics in each segment, if the current or stream can uniformly induce along the periphery of the segment all the quantity of fluid necessary—this being proportional to the product of the fluid mass constituting the current at the entrance at line M times the relative speed reduction undergone by the current upon crossing the segment considered, for instance the segment MN.

This relative speed reduction is equal to the difference between the speed of the current entering at line M, and the speed of the current leaving at line N, related to this first speed.

If for each of the current segments between the fiber production device and the collection belt the ambient air or gases can supply the quantity of gases necessary for the direction and slowing down of the current to have the desired characteristics, an induced surrounding gas flow will be established along the current of fibers and accompanying gases and in the direction from production device 11 to the collection belt 15. This flow is represented on FIG. 1 by lines 27.

In fiber forming and collecting installations of the type represented in FIG. 1, all the gas induced by current 12 is formed by the atmospheric air entering chamber 22 through opening 28 which is of large dimensions near fiber production device 11.

Figure 2:
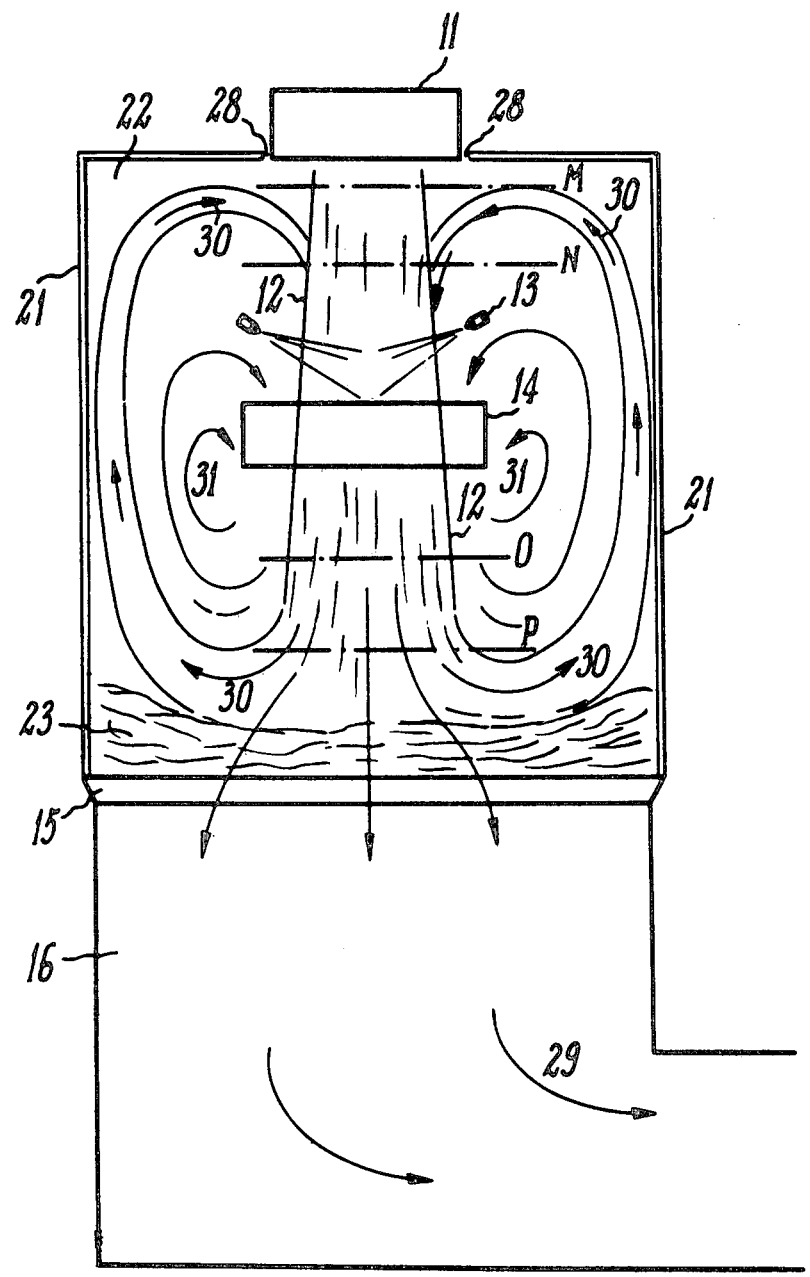
FIG. 2 similarly shows an installation of the type represented in FIG. 1, but in which the walls defining the receiving chamber are extended up to the fiber production device.

FIG. 2 shows a configuration of the fluid flow in a forming chamber when the surrounding medium cannot freely supply the jets coming from the attenuating device with all of the gases that they may induce; this configuration is given by way of example in order to clarify the description.

FIG. 2 represents part of the collection installation containing a fiber production device 11, from which a current of fibers and gases 12 flows, a binder application device 13, a fiber distribution device 14, a collection belt 15, and a suction chamber 16 into which fumes 29 flow after they have traversed the blanket 23 being formed. All of these elements are identical to those in FIG. 1. However, in FIG. 2, walls 21 defining receiving chamber 22 are extended up to fiber production device 11, so as to extensively reduce the opening 28 through which chamber 22 communicates with the atmosphere, and consequently the quantity of atmospheric air entering this chamber.

Thus, if in any segment of current 12, and especially segments such for example as MN, (situated in a zone near the fiber production device 11—i.e., near the ejection orifices of the guiding or attenuating jets for the material to be fiberized, or near the guiding jets of the fibers, and therefore in the region where the speeds of these jets are the highest) the surrounding medium cannot supply current 12 with all the gases that the current may induce, the segments of current 12 situated downstream, such for example as OP, (in which current 12 has a slower speed) will furnish the lacking quantity.

Gas currents 30, emanating from the downstream zones of the current or stream 12 itself, will rise along walls 21 towards the upstream zones at higher speeds, will be picked up by the current and will be reaccelerated in the general flow direction of this current. Thus, the eddies represented by 31 will appear and develop between the boundaries of current 12 and the walls 21 of the chamber. The intensity of these eddies increases with the quantity of fluid that the surrounding medium has not been able to furnish. Their direction of circulation is such that the fibers which they extract from the blanket 23 being formed and which they carry, are directed along walls 21 of the chamber towards the fiber distribution device 14, the binder application devices 13, or the fiber production device 11.

If the quantity of atmospheric air entering the receiving chamber of an installation of the type shown in FIGS. 1 and 2 is reduced to a value much less than the quantity of air that the current can induce, the intensities of eddies 31 may be sufficient so that the fibers that they carry cling to the fiber distribution and binder application devices, disturbing the smooth functioning of those devices. These eddies also have the effect of disorganizing the blanket 23 being formed, as is indicated in FIG. 2.

The industrial use of installation of this type shows that the phenomenon whereby the fibers are driven upwards may be acceptable as long as the quantity of air entering the chamber is no less than 60 to 70% of the necessary quantity. Below this value, operation is no longer industrially practicable.

If it is desired to further reduce, or totally eliminate, the quantity of atmospheric air entering the chamber, the turbulence in the chamber would be such that the fibers could not be deposited on the collection belt.

Installations According to the Invention

One of the objects of the invention is to furnish a process making it possible to considerably reduce the quantity of atmospheric air entering the forming section, while preserving the conditions suitable to the formation of the blanket.

This process consists of using as induced fluid, not the atmospheric air, but some of the fumes taken from the outlet of the exhaust fan, i.e., returning to or recycling in the forming section some of the fumes that are withdrawn from this section.

Figure 3:
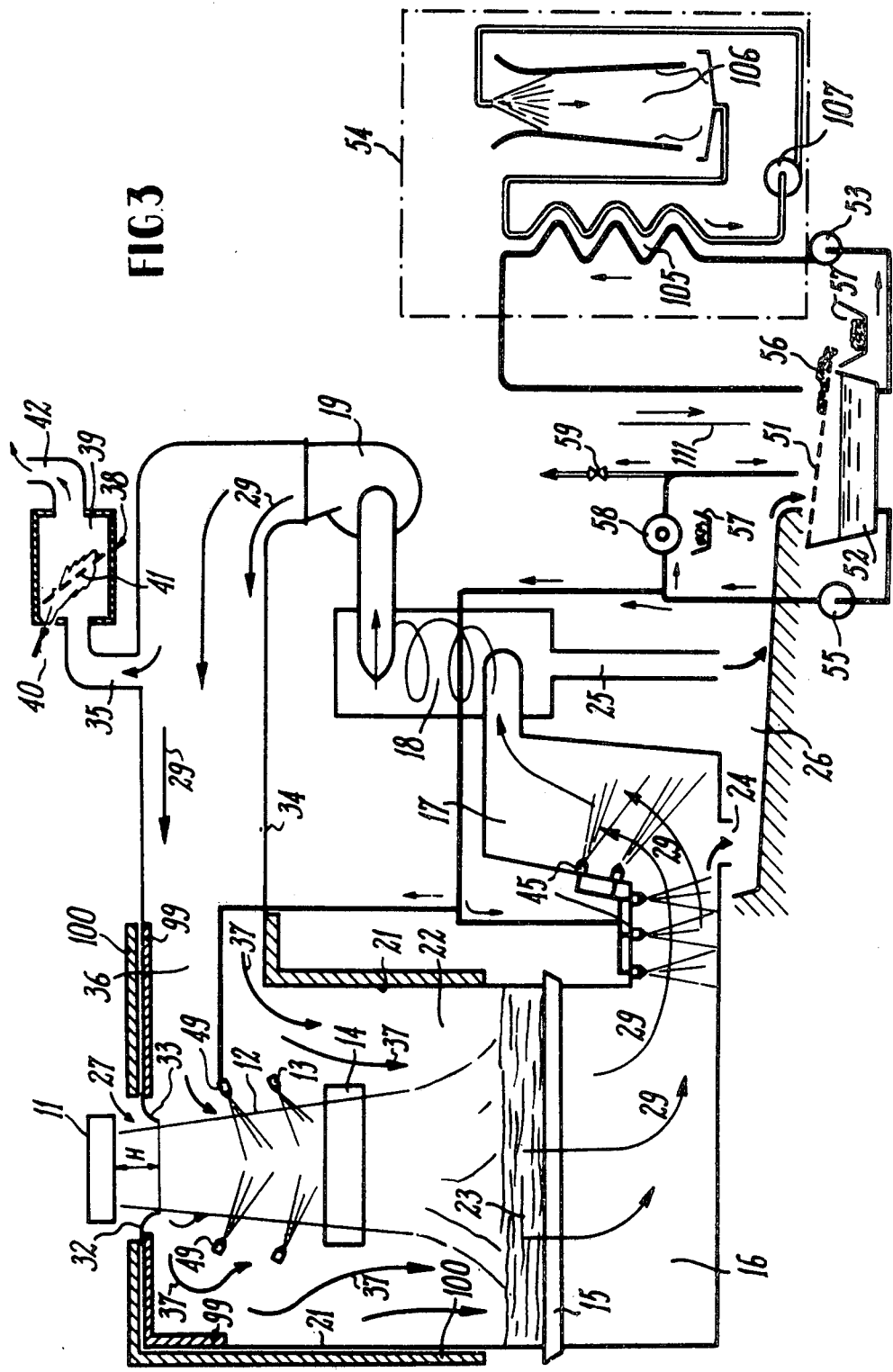
FIG. 3 shows a fiber collection installation of the general kind shown in FIGS. 1 and 2, but modified by the addition of equipment according to the present invention.

A set-up permitting the implementation of this process is represented in FIG. 3. The upper part of receiving chamber 22 is closed by a cover 32 containing an orifice through which current 12 of fibers and accompanying gases coming from fiberization device 11 penetrates forming section 22. The edges 33 of this orifice are tangential to current 12 and are of such a profile as to facilitate passage of the above-mentioned current.

For the sake of operating convenience, cover 32 may be placed at a distance H from fiberization device 11.

The set-up in FIG. 3 consists of a washing chamber 17, placed downstream from the suction chamber 16 and generally larger in section than the latter chamber, equipped with apparatus in which fumes 29—i.e., the gases accompanying the fibers between production device 11 and collection belt 15, and the pollutants in suspension—are placed in contact with a washing fluid, in particular water. In this washing chamber 17, the fumes are separated from a portion of the elements that they contain in suspension—the latter elements essentially consisting of fibers and the binder with which they are charged upon passing through the zone where binder is applied and the fiber blanket is formed. In contact with the washing water, the fibers contained in the fumes retain droplets of water and subsequently have a tendency to be deposited by gravity on the bottom of chamber 17, this phenomenon being moreover accelerated by the abrupt reduction in speed of the fumes as a result of the variation in the flow section along their path of travel from chamber 16 to chamber 17. Some of the droplets or pollutant vapors are intercepted by the droplets of washing water, and are dissolved by this water. It is the functioning of these two operations together which constitutes the washing of the fumes. The water which was used for washing, and to which at least some of the pollutant charge of the fumes was transferred, is discharged through orifice 24.

This set-up also contains a separation system 18, of the cyclone or electrostatic type, placed between washing chamber 17 and the suction fan 19, in which the fumes are at least partially stripped of the water droplets with which they are charged during the washing operation, and which it is important to eliminate before entering fan 19. The washing water extracted from the fumes in the liquid form is evacuated from the separation system through orifice 25.

A collector 26 leads the washing water evacuated through orifices 24 and 25 towards the treatment zone.

As above mentioned, the current of fibers and gases passes the binder devices 13 and then fiber distribution device 14. The fibers are deposited on collection belt 15 and the fumes 29 pass through the fiber blanket 23 being formed, through chamber 16, and through water separating unit 18, and are driven upwards by a fan 19 into flue 34. Some of these fumes are evacuated from the system through orifice 35. The rest are led through flue 34 towards forming section 22, in which they penetrate through an opening 36 placed in a zone situated near the fiber production device 11.

The quantity of gas entering the forming section through opening 33 is equal to the sum of the quantity of gas coming from production device 11 and the quantity of air induced by the latter as they pass in the open air, along the length H. The quantity of gas entering the chamber therefore increases with the length H.

For the system to be in equilibrium, it is necessary that the quantity of fumes evacuated from the system through discharge orifice 35 be equal to the quantity of gas entering the system through orifice 33. The quantity of fumes to be evacuated will thus decrease when the distance H is reduced.

Figure 4:
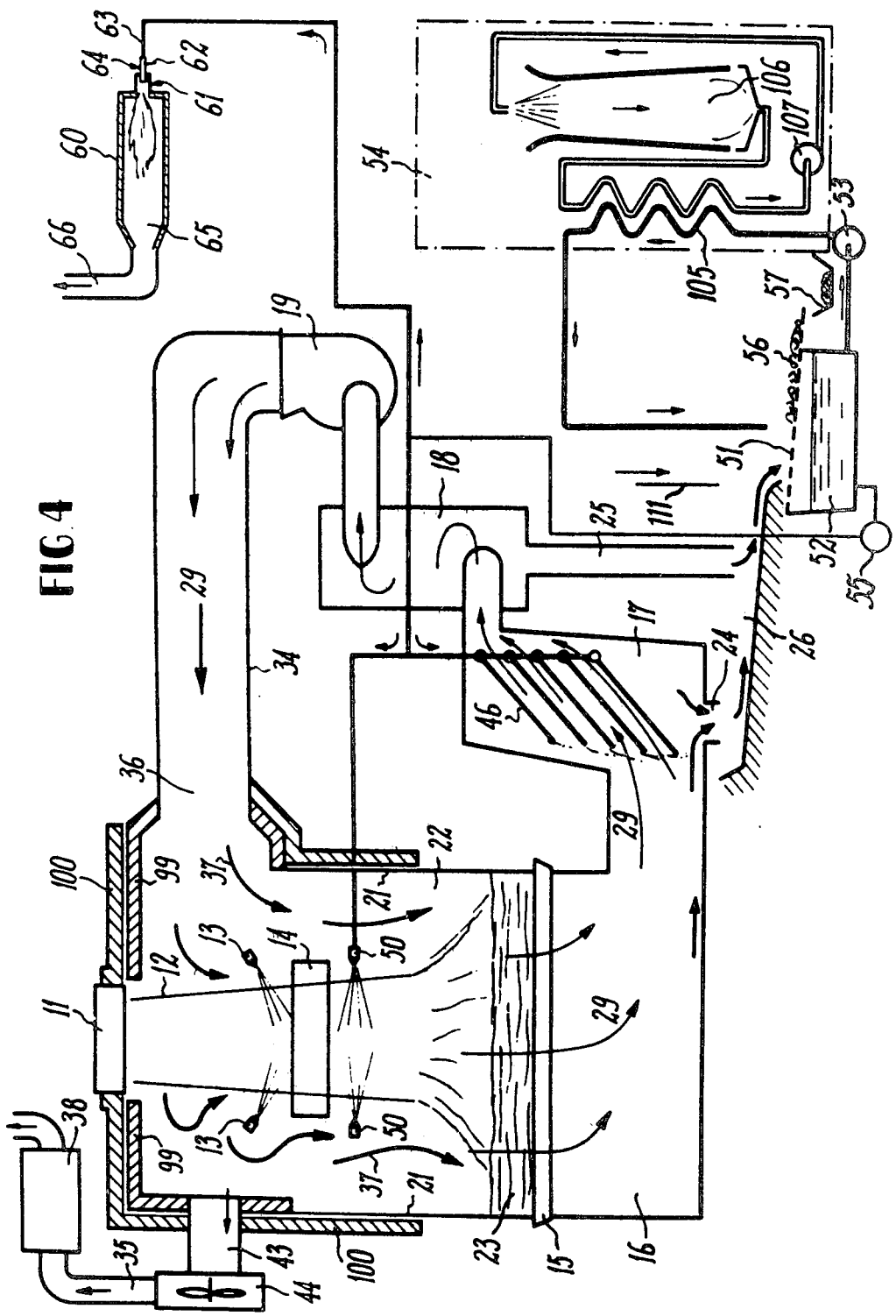
FIG. 4 shows another embodiment of an installation according to the invention.

FIG. 4 shows a particular embodiment according to the invention, in which distance H is zero, i.e., in which fiberization device 11—or at least the ejection orifices of the attenuating and guiding jets—are situated in chamber or section 22. The quantity of fumes to be evacuated from the system will be very nearly equal to the quantity of fluids coming from production device 11.

Figure 7:
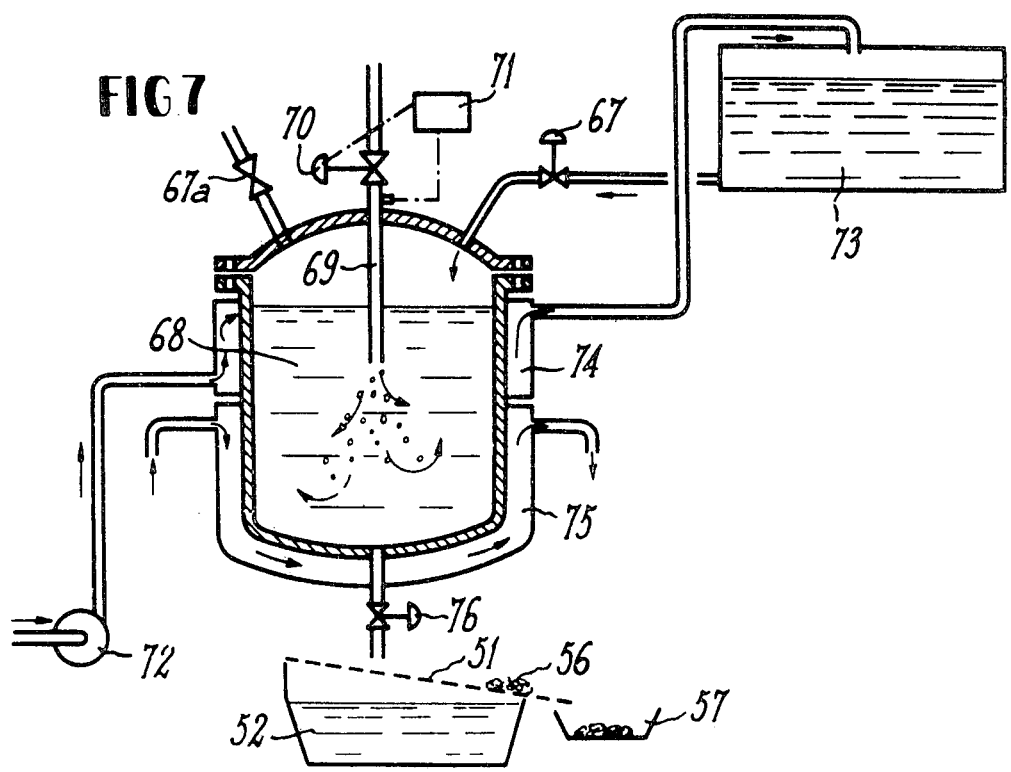
FIG. 7 shows a set-up providing for treatment of wash waters by heating under pressure, as is contemplated by the invention.

FIG. 7 shows a discontinuous operation set-up for the application of this treatment process. The water to be treated is introduced to chamber 68 through motorized valve 67. The quantity of water introduced, or the charge, represents 70 to 80% of the capacity of this chamber. The heating fluid or vapor—preferably superheated—then penetrates the chamber through injector 69, whose outlet orifice is immersed. The quantity of vapor is regulated by motorized valve 70, controlled by regulator 71.

The treatment cycle takes place as follows.

Chamber 68 contains a water charge to be treated which is initially under atmospheric pressure.

The treatment pressure desired, for example 16 bars absolute, is recorded on regulator 71.

Valve 70 opens and the vapor flows through injector 69, mixes with the water to be treated, and upon condensing transmits all of its latent and sensible heat to the water. The temperature and the pressure in chamber 68 rise until reaching approximately 200° C. and 16 bars absolute.

The introduction of vapor is then terminated. Injector 69 has been adjusted so that this temperature and pressure rise is rapid, occurring in less than one minute.

The water is maintained at 200° C. and 16 bars absolute for two to four minutes.

At the end of this period of time, a pump 72 is put in operation in order to deliver through jacket 74 a new charge of water to be treated, into a vat 73. As it passes through the jacket the water to be treated—which is at a temperature of approximately 40° C. at the entrance—initiates the cooling of the treated water contained in chamber 68. The dimension of jacket 74 is adjusted so that the water to be treated reaches vat 73 at a temperature of approximately 80° C.

A supplementary cooling fluid circulates in the jacket 75 and completes the cooling of the treated water contained in chamber 68. This cooling is considered to be completed when the temperature of the treated water drops below 100° C., and preferably 40° to 50° C. At this moment, a motorized valve 76 is progressively opened in order to decompress chamber 68.

The treated water flows towards a filtration station 51, or a flocculation, decantation, or centrifuging device, which separates the binder insolubilized by the treatment from the treated water.

The filtered water flows into vat 52 and the extracted wastes 56 are delivered to a conveyor 57.

When chamber 68 is empty, valve 76 is closed and valve 67 is opened, thus permitting the preheated charge of water in vat 73 to flow by means of gravity into chamber 68. An exhaust 67a completes the installation.

A new cycle may be started again.

Figure 8:
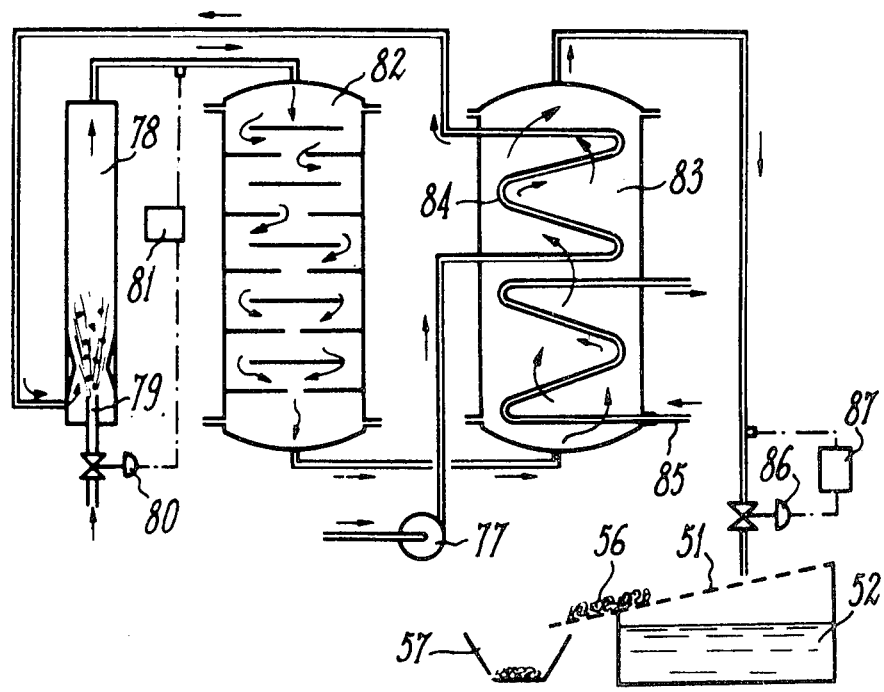
FIG. 8 shows a set-up in continuous operation for treating the waters.

FIG. 8 shows a continuous operation set-up for the application of the treatment process.

A pump 77, under the treatment pressure, sends the water to be treated to a mixer 78 in which an injector 79 is arranged, through which the heating fluid consisting of steam is introduced. This steam mixes with the water to be treated and, upon condensing, transmits its total heat to this water. The steam flow is regulated by motorized valve 80 controlled by regulator 81, in order to maintain the desired treatment temperature at the outlet of mixer 78. Subsequent to leaving mixer 78 in which it has remained for 10 seconds, the water to be treated passes through a reactor 82, where insolubilization of the binder takes place—the dimensions of which are adjusted so that the retention time of the water to be treated corresponds to the duration of treatment, for instance 2 to 4 minutes.

Subsequent to leaving the reactor, the water is cooled in an exchanger 83, to a temperature less than 100° C., and preferably from 40° to 50° C. Some of this cooling is provided by the water to be treated, which is thus preheated in coil 84 from approximately 40° C. to approximately 80° C.

The rest of the cooling is provided by a cooling fluid circulating in coil 85.

Subsequent to leaving exchanger 83, the treated and cooled water is decompressed to atmospheric pressure through a pressure-reducing valve 86 which, controlled by a regulator 87, maintains the treatment pressure in the installation.

The decompressed water flows towards a filtration device 51, or a flocculation-decantation or centrifuging device, which separates the binder insolubilized by the treatment from the treated water. The filtered water flows towards vat 52 and the wastes 56—residues of the treatment—are delivered to a conveyor 57.

The set-up shown in FIG. 8, of the continuous operation type, permits a more flexible and less costly treatment than that shown in FIG. 7.

Another process consists of subjecting some of the washing water, containing the pollutant elements, to a bacteriological treatment in an aerated pond. In such a pond, the bacterial organisms present are responsible for the enzymatic destruction of the phenol products, in particular, present in the water. By means of an operation corresponding to a total oxidation reaction, the treatment leads to the transformation of the phenol products, in particular, into non-pollutant elements such as $CO_2$ and $H_2O$. In order for this reaction to be total, it is necessary by aerating the pond to supply the bacterial organisms and the oxidation reaction with the necessary oxygen.

The installations for the manufacturing of agglomerated fibrous panels discharge a large quantity of waste varying in make-up, but always containing the binder or pollutant binder components.

It is first of all the manufacturing wastes of the panels which are rejected by quality control. These wastes contain extensively dispersed pollutant elements, but are very voluminous. Then there are the wastes coming from the cooling and washing water filtration, which contain fibers and a very large concentration of binder and binder components. Up to the present, all of these wastes have ordinarily been stored in quarries.

This practice is objectionable because of resultant pollution.

The invention provides a process for transforming the wastes into non-pollutant elements. After a preliminary preparation, it consists of submitting the wastes to a heat treatment which, by burning, transforms the pollutant materials into non-pollutant elements such as $CO_2$ and $H_2O$.

Figure 9:
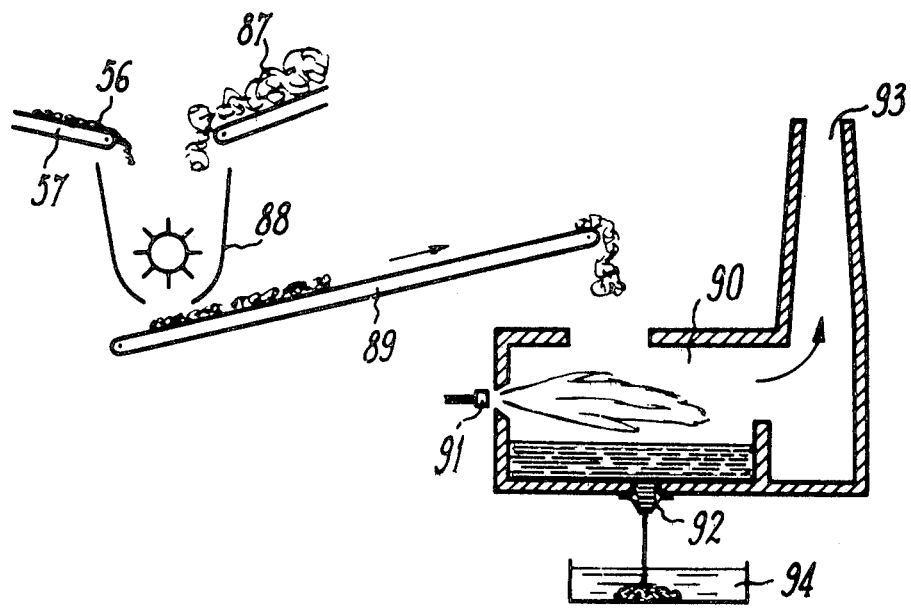
FIG. 9 shows a set-up providing for one of the solid waste heat treatments of the invention.

FIG. 9 shows a set-up permitting the application of the process.

Wastes 56 coming from thermal treatment and water filtration stations are carried by conveyor 57 and delivered into a comminuter 88, where they are mixed with waste agglomerated fibrous products 87 coming from the manufacturing process.

Upon leaving comminuter 88, the mixture is poured into an incinerator 90, by means of conveyor 89. The heat released by burner 91 increases the wastes to a temperature greater than 1,000° C. At this temperature, the binder and the binder components are transformed into non-pollutant elements such as $H_2O$ and $CO_2$ and evacuated into the atmosphere with the combustion gases from burner 91, through stack 93. The material constituting the fibers, softened by the heat, accumulates on the bottom of furnace 90, is evacuated from this furnace via drain 92 in the form of a viscous stream and cooled in vat 94 filled with water. The cooled material thus appears in the form of granules, which may be retransformed into fibers.

Figure 10:
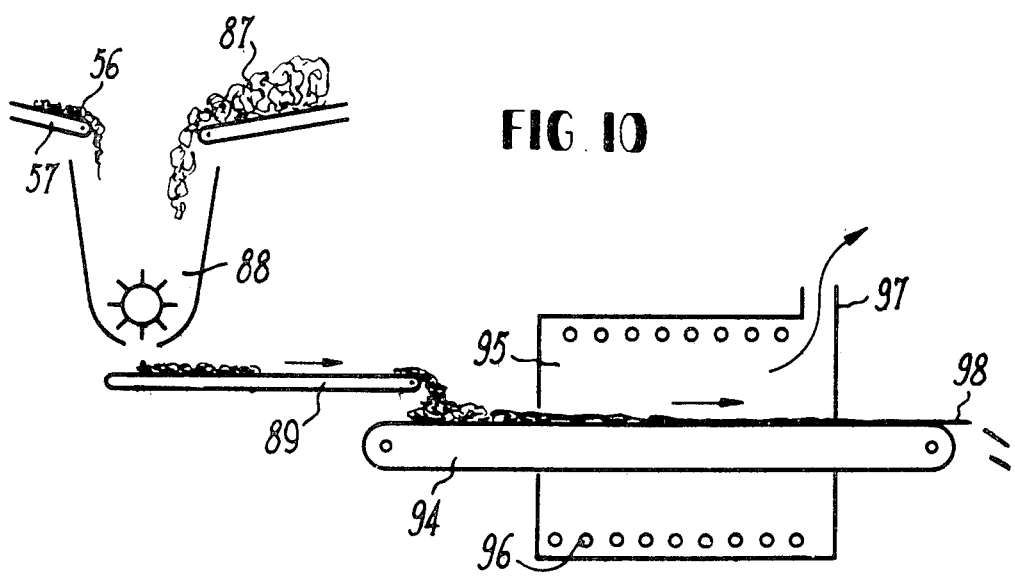
FIG. 10 shows a set-up providing another solid waste treatment process.

FIG. 10 shows another set-up permitting the treatment of the wastes.

The mixture of wastes 56 and 87, leaving communiter 88, is deposited by conveyor 89 on a belt 94 which extends through furnace 95. By means of the heat released by the radiating burners or electric resistances 96, this furnace increases the wastes to a temperature on the order of 600° to 700° C. At this temperature, the binder or binder components contained in the wastes are transformed into non-pollutant elements such as $CO_2$ and $H_2O$, evacuated through stack 97. The fibers constituting the majority of the wastes by volume are softened under the effect of the heat, are consolidated, and agglomerate by sintering in the form of plates 98 having a volume that is a great deal less than the initial volume of the wastes. These plates may then be reinjected into the fiber production circuit.

Another important characteristic of the invention is to reduce the noise emitted by the receiving installations with which the invention is concerned.

In these installations, the most important source of noise is the fiber production device, and more precisely the high-speed fluid jets that it emits. The noise level around the fiber production device, where the operators are brought to work, generally exceeds 100 decibels. The configuration of the zone surrounding the acoustic source in the open installation, such as are represented in FIG. 1, does not permit an effective insulation of the acoustic source with respect to the outside, because it is necessary to provide a free space of large dimensions for the passage of the induced air. On the installations built according to the invention and represented in FIGS. 3 and 4, closing wall 32—which contains orifice 33 through which the current of fibers and gas 12 enters chamber 22—and walls 21 of chamber 22 are given a configuration permitting the installation of absorbent acoustic panels 99, inside chamber 22, and insulating acoustic panels 100 outside chamber 22.

The reduction in the noise level obtained by installing these panels, in the zones surrounding fiber production device 11, is from 20 to 30 decibels—which considerably improves the working conditions of the operators.

Another source of sound is the fume exhaust fan 19. The acoustic power emitted by this fan is transmitted through the flues connecting with the stack which, situated outside the buildings housing the installation, radiate the sound into the surrounding environment.

On the installations represented in FIG. 1, the large volumes to be evacuated through stack 35, and the problem of limiting the pressure drop in this stack, have led to the installation of a large diameter stack directly at the outlet of fan 19, so that almost all of the acoustic power emitted by this fan is radiated.

On the installations built according to the invention and represented by FIGS. 3 and 4, the small volume of fumes evacuated makes it possible to place the point where the fumes are evacuated at a distance from fan 19. In FIG. 3, it is situated on recyling flue 34 at a point separated from fan 19 by at least one bend and a flue length sufficient so that at least part of the acoustic power emitted by fan 19 is absorbed by conduit 34. In the arrangement of FIG. 4 the offtake is also small and remote from the fan 19.

The reduction in the acoustic level in the zone surrounding stack 35 may reach 10 decibels or more.

Figure 11:
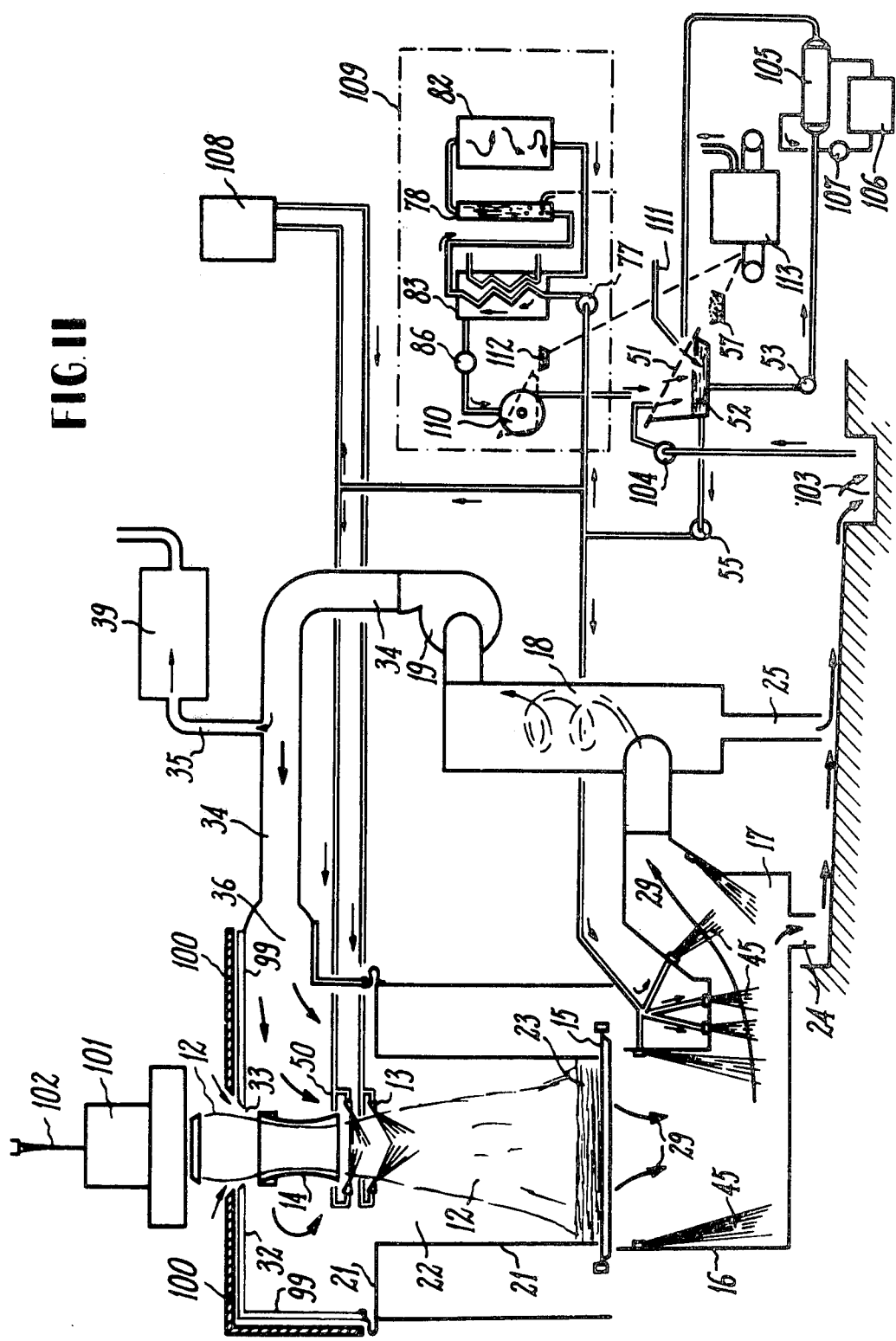
FIG. 11 represents a complete fiber collection installation used for the manufacture of fiber glass boards, made according to the invention.

FIG. 11 represents a set-up according to the invention, which contains:

A fiberization device 101 in which the melted material 102 is introduced to a unit revolving at a high speed; this has a certain number of orifices on its periphery, through which the material leaves under the action of the centrifugal force; the resulting fiber filaments are then subjected to the action of a concentric annular jet of high-speed hot gases generally directed downwards, which attenuates them into fine fibers;

A fiber distribution device made up of an oscillating tuyere 14 (for example as illustrated in U.S. Pat. No. 3,134,145), which surrounds current 12 of fibers and gas coming from the fiberization device;

A cooling device containing atomizers 50 for projecting cooling water on current 12. This device is placed between distribution apparatus 14 and binder application device 13;

A blanket collection device 15, consisting of a perforated belt;

A forming section 22, of a parallelepiped shape, bordered in the bottom by the perforated belt 15, laterally by vertical walls 21, and at the top by a horizontal wall 32 at a distance of 200 mm. under fiberization device 101, and containing a circular orifice 33 through which current 12 passes; the edges of this orifice are profiled so as to facilitate the entrance of current 12, and are tangential to this current; vertical walls 21 mark off the zone where the blanket is formed on perforated belt 15;

A compartment 16, positioned below the perforated belt 15 in the zone where the blanket is formed, and having its pressure reduced by a fan 19;

A suction and washing chamber 17, placed downstream from compartment 16, which contains atomizers 45 arranged so as to form sheets of water droplets upon the path of fumes indicated at 29;

Downstream from chamber 17, a water separator 18 of the cyclone type;

A fan 19, which forces all of the gases accompanying the fibers to pass through the belt 15, and which drives the gases into flue 34;

A recycling flue 34, whose downstream end empties—through opening 36 in the upper portion of chamber 22—into a zone surrounding fiber distribution device 14; quantities of recycled fumes on the order of 90 to 95% of those passing through perforated belt 15 are led into section 22 through opening 36, via recycling flue 34;

A conduit 35 situated on flue 34 evacuates from 5 to 10% of the fumes passing through the belt 15 towards the burning device 39; after passing through the burning device, where they are brought to a temperature greater than 600° C., the fumes are discharged into the atmosphere;

Absorbent panels 99 and insulating panels 100, placed on walls 21 and 32, in the zone near fiber production device 101;

A sump 103, which collects the washing-cooling waters charged with fibers and with the binder and binder components, dissolved or in suspension, coming condenses, transferring its heat to the films of water flowing over partitions 46 of washing chamber 17.

This water is discharged externally of the installation by orifices 24 and 25 placed at low points in chambers 16 and 17 and in water separating unit 18, into device 51, in which the solid particles in suspension in the water, notably fibers, are separated.

Device 51 may be either a filter, with meshes, of a known rotating or vibrating type, or a decanter, or a centrifuge, also of known type.

The water, free of suspended solid particles, is collected in a tank 52 and, in the embodiment of FIG. 3, the water is then directed, by gravity or by means of a pump 53, into a cooling station 54. Upon leaving this station, the cooled water may be discharged outside or reused in the system.

As shown in FIG. 3, station 54 may include a cooling tower 106, of known type, in which water is cooled by contact with air. The cooling water is circulated through the spray cooling tower by means of a pump 107. The water from tank 52 is brought into indirect heat exchange relation to the cooled water of the tower 54 by means of the heat exchanger indicated at 105, from which the cooled water may be returned to the tank 52. Make-up water may be introduced as by the water supply connection indicated at 111.

It is preferred to cool the washing water by indirect heat exchange with the cooling water (or other cooling fluid) circulating through the cooling tower 106, because this completely avoids polluting the air with any remaining volatile pollutants in the wash water, although the content of such remaining pollutants in many installations is so very low (for instance, less than 5% of the quantity discharged by the gas offtake of a non-recycled installation such as shown in FIG. 1) that it may be practicable to directly cool the wash water in the spray cooling tower 106.

An advantage provided by the invention, is that it is contemplated that no water in liquid state be discharged outside of the installation, so as not to contaminate the environment even by the small content of pollutants that the water still contains.

This implies that the water introduced through nozzles 49 or 50 and the washing water circulate in a closed circuit within the installation.

Figure 5:
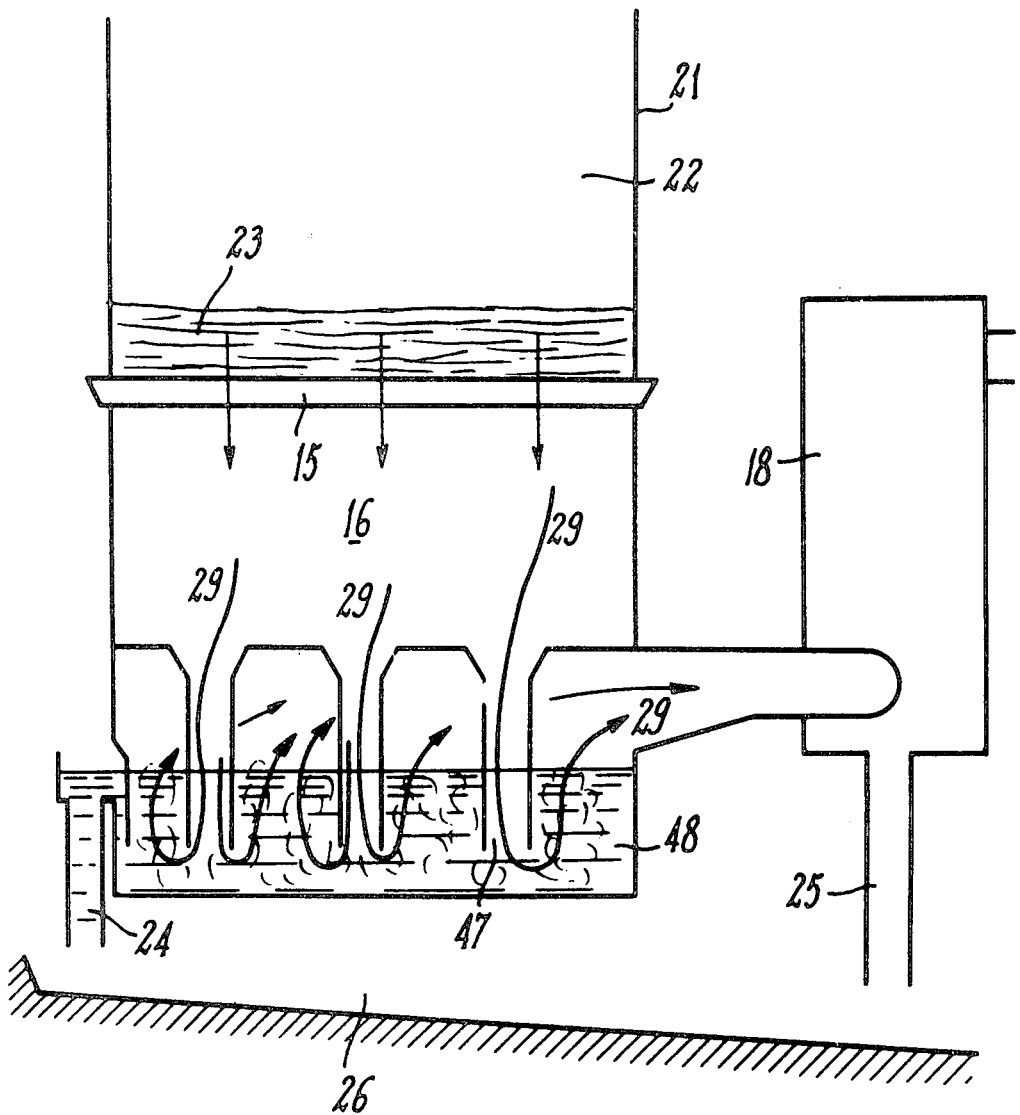
FIG. 5 shows another embodiment of a fume washing chamber which may be employed in various installations.

On the installations represented in FIGS. 3, 4 and 5, the closed circuit made by the cooling and washing water is the following:

The water leaving cooling station 54 is sent via pump 55 (FIG. 3) or 53 (FIG. 4) to cooling devices 49 and/or 50 situated in chamber 22, and also to the vapor condensation devices and fume washing devices placed in chamber 17, which include either the atomizers 45 as shown in FIG. 3, or the baffles with water film 46 as shown in FIG. 4, or the water may be sent towards the tank 48 shown in FIG. 5.

The washing water and the condensed vapor, charged with pollutants, fibers, and binder components, flow through orifices 24 and 25 placed at low points in washing chamber 17 and water separator 18, into a collector 26 which leads them towards filtration device 51; this separates solid wastes 56 in suspension, fibers, and insoluble binder components from the washing water.

These wastes are collected on a conveyor 57. Since the filtered washing water only contains dissolved binder components and pollutants, it is sent by gravity or via pump 53 towards cooling station 54.

The applicants have observed that when the washing water circulates in a closed circuit, it is necessary to maintain the concentration of the materials dissolved or suspended in the filtered water below a certain value, this being on the order of 3 to 4%—computed in unit of mass of dry materials per unit of mass of water. Above this value, some of the materials dissolved or suspended in the washing water (essentially microfibers or microparticles of binder not captured by filtration device 51, and soluble binder components) are deposited on different parts of the installation. The binder is polymerized, forming viscous or solid layers which progressively obstruct the washing water ejection orifices 45, 49 and 50 and also the orifices in collection belt 15 for the passage of fumes 29. As a result, there is a reduction in the quantity of fumes evacuated from the hood and in the cooling of these fumes, soon leading to shut-down of the installation.

In order to maintain the concentration of materials carried in the water below the value which will obstruct spraying or fume evacuation, it is necessary to extract large quantities of materials from the washing water. In operation, a large proportion, on the order of 20 to 30% of the binder sprayed on the fibers by nozzles 13 ends up in the washing water, in the manner already described. For large plants, this makes it unavoidable that 3,000 to 5,000 kilograms of binder per day (counted in dry material) will be introduced into the closed circuit for circulation of the washing water, and it is necessary to extract from the water quantities of binder identical to those introduced in order to maintain the concentration at an equilibrium value.

Several extraction processes are possible

One of these processes consists of treating at least some of the washing water in a centrifuge, which is capable of separating from the water solid particles in suspension that are much smaller than can be handled by filter 51. Thus, as seen in FIG. 3, the water treated by centrifuge 58 may return to vat 52, as is shown on FIG. 3, or more advantageously may be sent to cooling device 49.

Another process consists of treating the water by the addition of a flocculant, followed by separating the flocculated material.

These two processes have the disadvantage of essentially extracting from the water only the insoluble materials that it contains. The dissolved binder, which constitutes the greatest part of of the materials to be extracted, is not affected or is affected only slightly.

The invention provides several processes for extracting the binder dissolved in the washing water.

One process consists of using the filtered or centrifuged washing water to dilute the binding agents upon preparation of the binders applied to the fibers by application device 13. The filtered water may be removed from any point whatsoever in the circuit downstream from cooling station 54, or more advantageously downstream from centrifuge 58, as shown in FIG. 3, by means of valve 59.

Another process consists of using the washing water as a fluid for cooling current 12 of fibers and gas, in chamber 22. The washing water is thus projected against current 12 by cooling device 49, as shown in FIG. 3, or by 50 in FIG. 4.

These two processes have the advantage that they permit the reutilization of some of the binder contained in the washing water, and it is contemplated by the invention to regulate the quantity of binder dispersed by application device 13 as a function of the quantity of binder that the blanket 23 being formed retains from the water projected by devices 49 or 50, which permits an improvement in the binder efficiency; but these processes do not permit extracting from the washing water quantities of dissolved binder sufficient so that the concentration of this water is maintained below the desired value. It is for this reason that the invention provides two processes which make it possible to complete the extraction of large binder quantities dissolved in the water circulating in the closed circuit.

One of these processes consists of burning a small portion, on the order of 1 to 5%, of the washing water flowing into the circulation circuit, in an appropriate device 60. This device, represented on FIG. 4, is of known type and contains:

a burner 61 supplied with a combustible air-fuel mixture;

an atomizer injector 62, in which the water to be treated arriving through pipe 63 is projected in the form of pressurized droplets into the flame of burner 61, under the effect of atomization air 64; and a reaction chamber 65 in which, under the effect of the heat released by burner 61, the washing water treatment is carried out. This consists first of all of vaporizing the washing water and then of raising the vapor produced as well as the binder components provided by the water to a temperature on the order of 800° C.—which permits these binder and pollutant components to be transformed into non-pollutant elements such as $CO_2$ and $H_2O$.

The non-pollutant vapor escapes through stack 66 externally of the installation, at a high temperature—thus preventing the formation of a cloudy plume.

The point where the water to be treated is removed is generally located between pump 55 and the devices 50 and 46, as is shown on FIG. 4.

This process has the advantage of extracting and transforming into non-pollutant elements all the binder components contained in the treated washing water. It has the disadvantage of requiring a large expenditure of energy and thus of being very costly. The influence of the treatment cost on the price of the fibrous products manufactured may be reduced by recovering some of the quantity of heat from the high-temperature vapor, in an exchanger producing superheated vapor for various uses.

The other process consists of subjecting to a heat treatment a small portion—on the order of 1 to 5%—of the flow of washing water charged with dissolved binder circulating in the circuit, so as to insolubilize the binder, followed by separating the binder from the water by any appropriate means of separation such as filtration, flocculation, centrifuging . . . .

In operation, the applicants have observed that if the water used for cooling and washing of the fumes—and thus, after filtration, containing the binder or dissolved binder components—is maintained at a given temperature for a given period of time, a proportion of the dissolved binder increasing with the temperature and the time would be transformed into insoluble particles and would subsequently be found in suspension in the water and could then be easily separated from the water.

The proportion of dissolved material—insolubilized by the treatment—characterizes the efficiency of the treatment.

The treatment temperature has a very important influence on the efficiency. For example, it has been found that for a water containing 1% dissolved binder component, the treatment efficiency is:

40% if the water is maintained at 40° C. for eight days;

40% if the water is maintained at 70° C. for three days;

40% if the water is maintained at 160° C. for three minutes;

60% if the water is maintained at 180° C. for three minutes;

95% if the water is maintained at 240° C. for three minutes.

Figure 6:
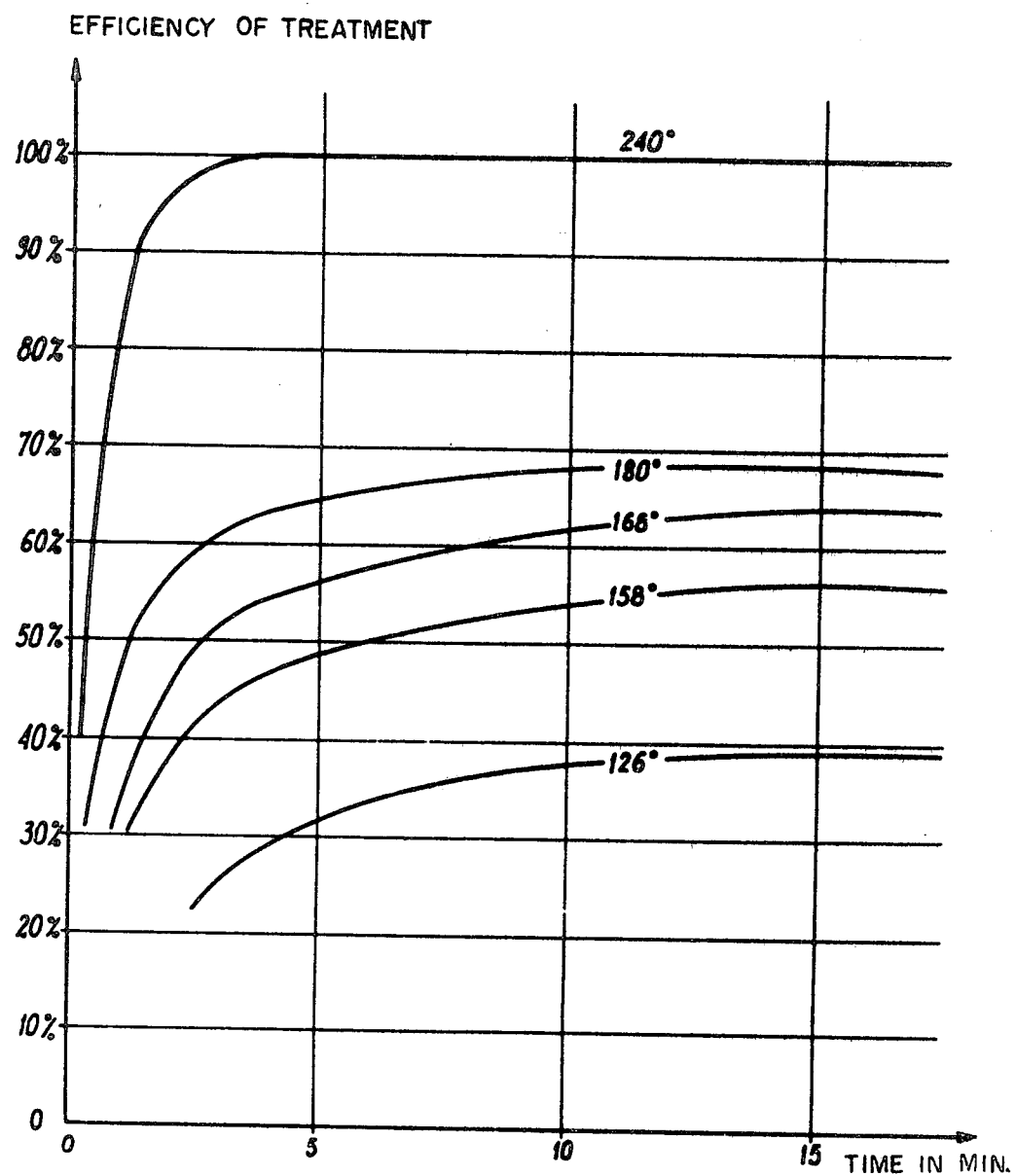
FIG. 6 depicts the evolution of the efficiency level for the insolubilization treatment based on treatment temperatures and times.

FIG. 6 shows the evolution of the treatment efficiency as a function of the temperature and of the treatment time.

In large capacity plants manufacturing panels of agglomerated fibers, since the quantities of water to be treated may reach 50 m³/h, in order to avoid the installation of treatment plants of considerable dimensions, it is necessary to determine the shortest treatment times and thus to work at high temperatures, greater than 100° C. This means carrying out the treatment in a pressurized chamber, at a temperature maintained at approximately 5° C. below the boiling temperature of water at the pressure of the chamber, so that the water remains in the liquid phase throughout the duration of treatment. This solution also has the advantage of requiring only a small energy expenditure which, with respect to the wastes, only corresponds to the increase in heat imparted to the water in order to raise its temperature.

Thus, with an identical quantity of dissolved binder extracted, this process is one-quarter as costly as the process by burning previously described.

One of the disadvantages ordinarily encountered when heating in a chamber water containing the binder or dissolved binder components, even in a weak concentration, is that an insolubilized binder deposit forms on the walls of the chamber which very quickly becomes thick enough to obstruct the evacuation orifices of the chamber, or the chamber itself.

The applicants have observed that if the heat necessary for treatment is released in the water mass to be treated and the wall of the chamber is maintained throughout the treatment at a temperature less than that of the water mass treated, there is no formation of deposit on the wall, the insolubilized binder remaining in suspension in the water. This leads to heating the water, either by mixing with hot fluids such as steam that has preferably been superheated, or with immersed burner combustion gases, or by means localizing the energy in the midst of the water mass such as an electric arc.

A wide range of operating conditions is possible, for example 6 to 40 bars for the absolute pressures, from 150° to 240° C. for the temperatures, and from 3 to 10 minutes for the treatment duration.

The following conditions are the result of a satisfactory compromise between the energy cost and the equipment maintenance cost:

temperature: 200° C.
pressure: 16 bars absolute
duration: 5 minutes
efficiency: from 70 to 80%.

This method of treatment may be applied to a discontinuous operation set-up or to a continuous operation set-up.

from orifices 24 and 25 placed at low points in chamber 17 and cyclone 18;

A pump 104, which delivers the water contained in the sump to a filtration device 51;

A filtration device 51 of the vibrating type with a screen, which separates the insoluble wastes from the washing water;

A vat 52 placed under filter 51, in which the filtered water is collected;

An indirect heat exchanger 105, in which the water contained in vat 52 circulates and is returned to the vat 52 under the action of pump 53, and is cooled by releasing the heat absorbed by contact with fumes 29, as it passes through chambers 22 and 17 and compartment 16;

A cooling tower 106, in which the cooling water from exchanger 105 circulates under the action of pump 107;

A pump 55 which puts the water from vat 52 back into circulation and delivers it toward the spray cooling devices 50 for the fiber and gas current, and toward the condensation and washing spray devices 45 for the fumes 29, and still further toward the binder preparation station 108, and the water treatment station 109;

A water treatment station 109, in which the water to be treated is subjected to an increased pressure of 16 bars absolute via pump 77, subsequently passing through an exchanger 83 in which it is heated up to approximately 80° C.; upon leaving this exchanger, the water to be treated enters a mixer 78, where it is placed in contact with a flow of steam that has preferably been superheated, consequently increasing its temperature to 200° C.—at which it is maintained for two to four minutes in reactor 82 connected with the outlet of mixer 78; upon leaving reactor 82, the treated water is passed through the exchanger 83 and is cooled to a temperature of 40° to 50° and then decompressed to atmospheric pressure via pressure-reducing valve 86, after which it is sent to a centrifuge 110 which separates the binder insolubilized by the treatment from the treated water; the treated water is returned to vat 52;

A fresh water supply line 111, delivering into vat 52, makes it possible to maintain the quantity of water in the installation constant;

Conveyors 57 and 112, carrying the wastes from filtration station 51 and water treatment station 109, and also the waste materials from the manufacturing line, toward the waste treatment station 113; and A waste treatment station 113, consisting of a furnace equipped with radiant gas tubes or electric resistances, in which the wastes are brought to a temperature on the order of 600° to 700° C., so as to burn the binder and the binder components, and to sinter the fibers in thin plates of reduced dimensions, which may be reintroduced in the fiber production circuit.

Figure 12:
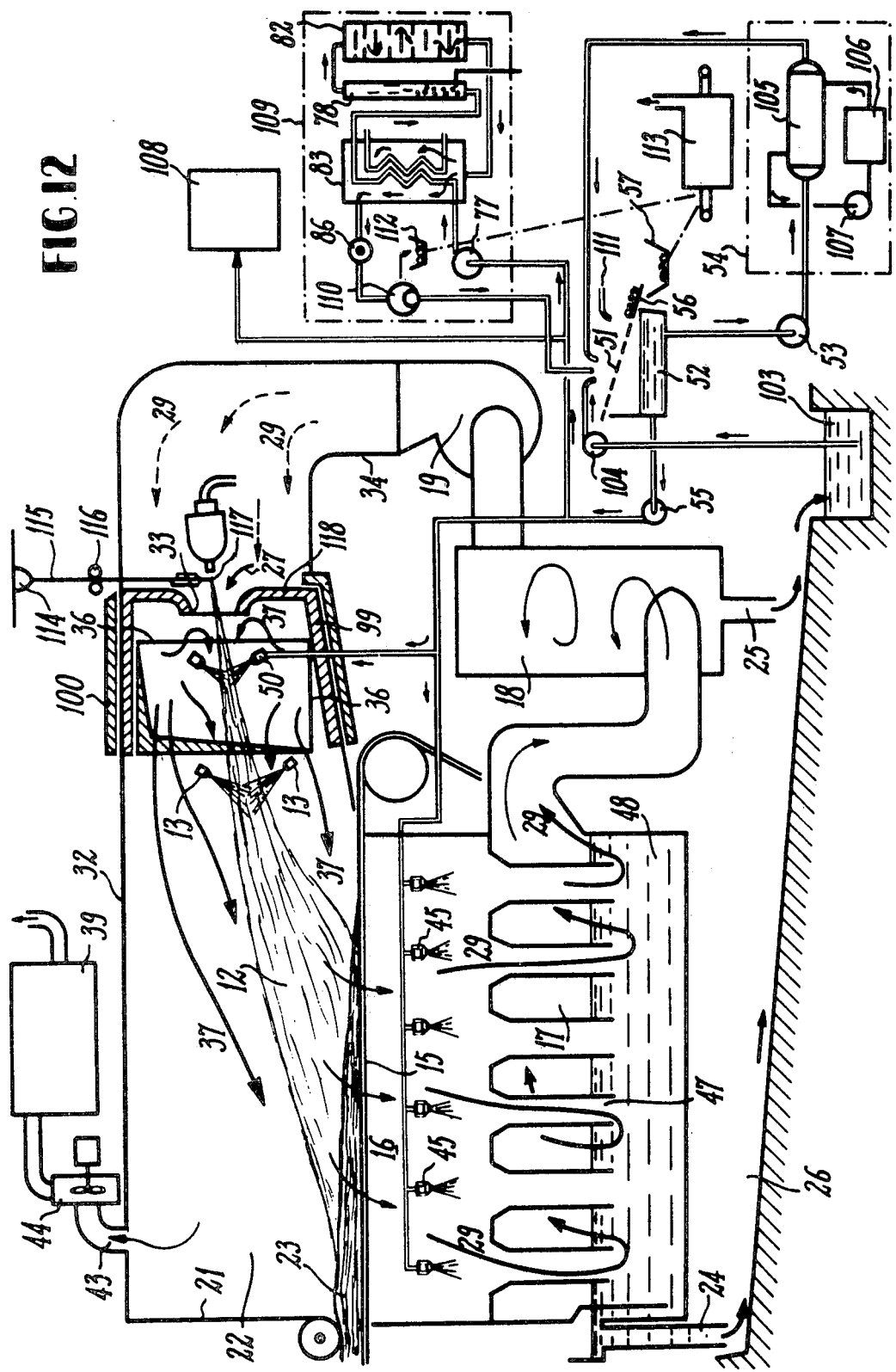
FIG. 12 shows an embodiment of the invention as applied to another fiber glass manufacturing process.

FIG. 12 represents another set-up according to the invention, which includes:

A fiberization device in which the melted material, and especially glass, flows from a crucible 114 in the form of fine primary streams 115 that solidify before coming into contact with pulling rollers 116, which introduce the solid filaments or rods into a high-speed hot gaseous jet 117—ordinarily in a direction practically perpendicular to this jet. As a result the ends of the rods are heated and softened, so that the jet can attenuate them into fibers and carry these fibers to the blanket or mat forming unit 15, in the form of a current 12 made up of fibers and gas. FIG. 12 further includes:

A cooling device containing atomizers 50, for projecting cooling water on current 12;

Binder application devices 13 for projecting the binder on current 12, situated downstream from the cooling device, in the direction of flow of circuit 12;

A blanket formation unit 15, consisting of a perforated belt; and

A forming section 22, having a parallelepiped shape, bordered at the bottom by perforated belt 15, laterally by vertical walls 21, at the top by wall 32, and in the rear by vertical wall 118 placed approximately 200 mm. from the ejection orifice of jet 117 and containing a rectangular orifice 33 through which the current 12 passes. The edges of this orifice are profiled so as to facilitate the entrance of current 12, and are tangential to this current. Vertical walls 21 border the zone where the blanket is formed on perforated belt 15.

FIG. 12 further includes:

A suction compartment 16, placed beneath perforated belt 15, in the zone where the blanket is formed;

A washing chamber 17, placed beneath compartment 16, containing orifices 47 which open below the surface of a body of water 48, and through which fumes indicated at 29 flow; atomizers 45 spray the washing water, and the water overflows through pipe 24 for delivery to collector 26;

Downstream from chamber 17, a water separator 18 of the cyclone type;

A fan 19, which forces all of the gases accompanying the fibers to pass through the fiber collection device and to deliver the gases into flue 34;

A recycling flue 34, whose downstream end empties into chamber 22 through two openings in the two vertical walls 21 situated one on each side of the fiberization apparatus, in a zone near this apparatus; quantities of recycled fumes, which may reach as high as 95% of the quantities passing through perforated belt 15, are led into chamber 22 through these openings;

A conduit 43, communicating with chamber 22 in a zone situated in an upstream zone of this chamber, which evacuates the non-recycled fumes through fan 44 to the buring device 39;

Absorbent panels 99 and insulating panels 100, placed on walls 21, 32 and 118 in the zone near the fiberization device;

A sump 103, which collects the washing-cooling waters charged with fibers and with the binder and binder components, dissolved or in suspension, coming from orifices 24 and 25 placed at low points in chamber 17 and cyclone 18;

A pump 104, which leads the water contained in the sump to a filtration device 51;

A filtration device 51 of the vibrating type with a screen, which separates the insoluble wastes from the washing water;

A vat 52 placed beneath filter 51, this vat collecting the filtered water; and

A heat exchanger 105, in which the water contained in vat 52 circulates under the action of pump 53 and is cooled by releasing the heat absorbed from the fumes 29, as they pass through chambers 22 and 17.

The installation that was just described also contains—as is shown—a water treatment station and a waste treatment station as described above with reference to FIG. 11.

Figure 13:
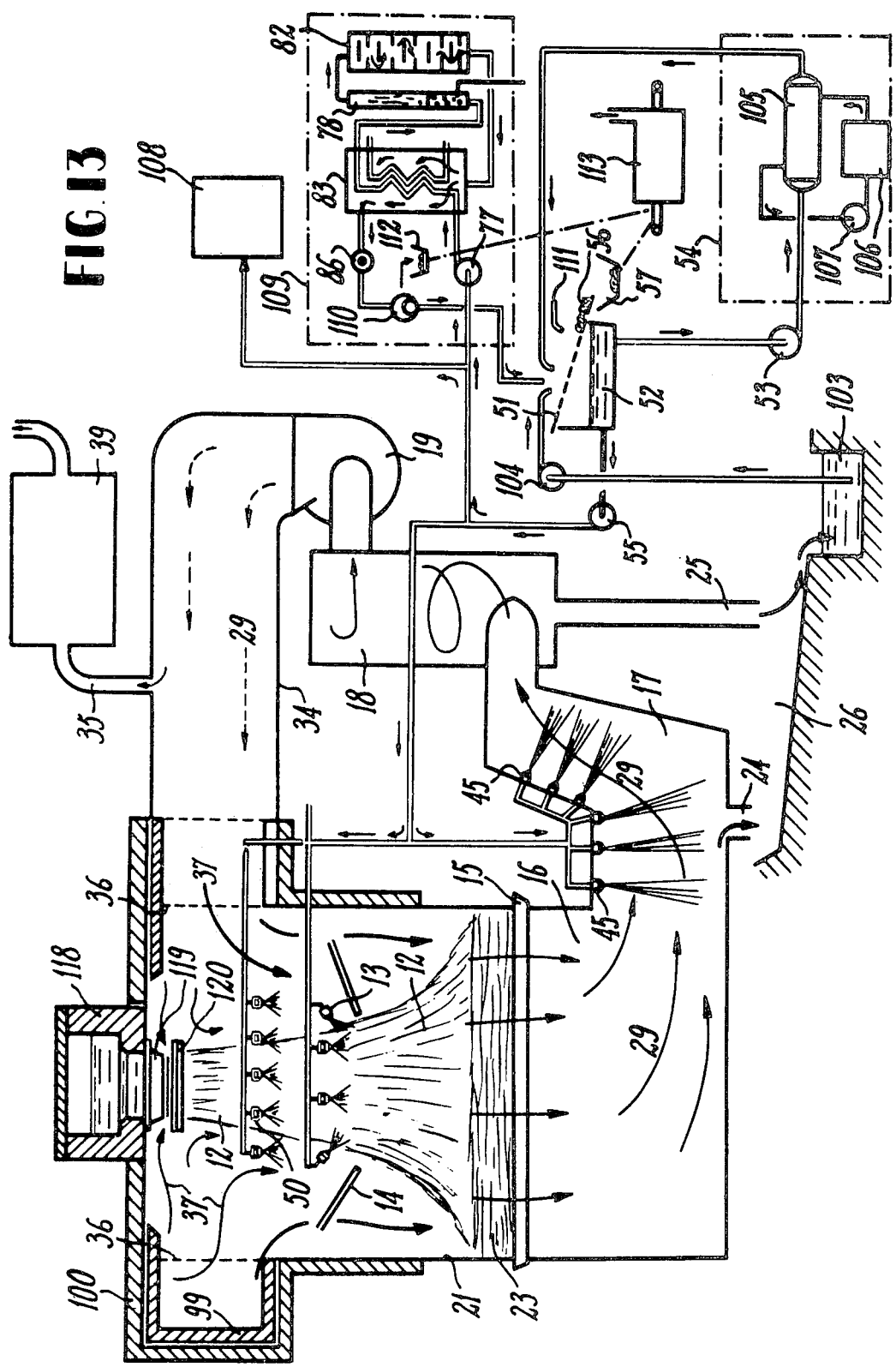
FIG. 13 shows another embodiment of the invention adapted to a process for the manufacture of mineral fibers by blowing.

FIG. 13 shows another set-up according to the invention, which comprises the following.

A fiberization device, in which the molten material flows from forehearth 118 of a furnace through the orifices of one of several rows of tips provided on a bushing 119, produces a large number of strands of material that flow into an attenuating zone, where they pass between high-speed convergent, gaseous jets. Jet ejection devices 120 are situated very close to the glass fibers, and the jets are directed downwardly, in a direction that is practically parallel to the direction of movement of the glass fibers. Usually, the jets consist of high-pressure steam. The fibers produced, the attenuating jets, and the surrounding fluid that they induce constitute current 12.

Cooling spray devices 50 project cooling water on current 12.

Binder spraying devices 13 project the binder on current 12.

A fiber distribution device 14, such as is shown in Berthon et al U.S. Pat. No. 3,020,585, is made up of two pressurized air injectors, for directing the fibers in the desired direction.

The rest of the installation represented in FIG. 13 is similar to that shown in FIG. 11.

In an installation of the general arrangement of FIG. 13 the fiberization may alternatively be of the toration type as disclosed in application Ser. No. 353,983, above referred to, now U.S. Pat. No. 3,874,886. Thus, in the general position of the devices indicated at 119 and 120 in FIG. 13, and in place of such devices 119 and 120, one or more intersecting and interacting glass carrier jets and blasts may be arranged to provide for the production of a current 12 of gases and attenuated fibers.

Figure 14:
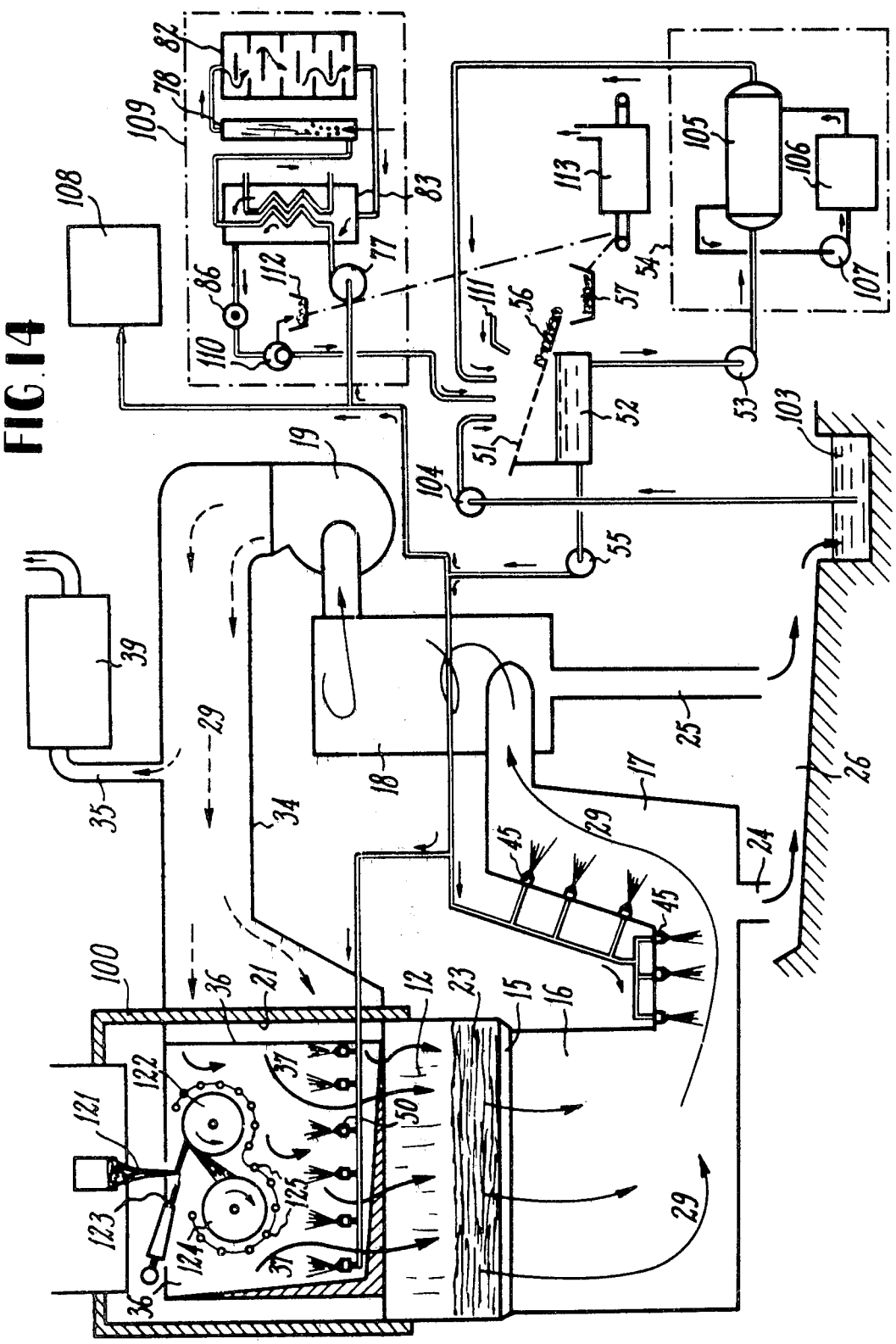
FIG. 14 shows another embodiment of the invention adapted to a process for the manufacture of mineral fibers, and especially of slag.

FIG. 14 shows another set-up according to the invention, which comprises the following.

A fiberization device is provided, in which material in the molten state and in the form of stream 121, is directed by high-speed jets coming from orifices 123, against the periphery of a rotor 122 turning at a high speed. Under the effect of the centrifugal force, revolving unit 122 transforms some of the material that it receives into fibers and sends the rest of the material to a second rotor 124, which transforms some of the material that it receives into fibers by means of a similar process. The number of rotors such as 122 is generally limited to two or three. By means of a ring provided with orifices 125 surrounding rotors such as 122 and 124, jets of fluid are emitted—also at a high speed— which act on the fibers produced, to direct them towards the receiving unit. These jets consist of air or stream under high pressure. Generally, orifices 125 are also used to project the binder on the fibers. Current 12 is made up of the fibers, the guiding jets, and the surrounding fluid that they induce.

Cooling spray devices 50, for projecting cooling water on current 12, are placed downstream from orifices 125, the binder being atomized via certain of these orifices. The rest of the installation represented in FIG. 14 is similar to that shown in FIG. 12.

Controls for Pollution Suppression Conditions

Figure 15:
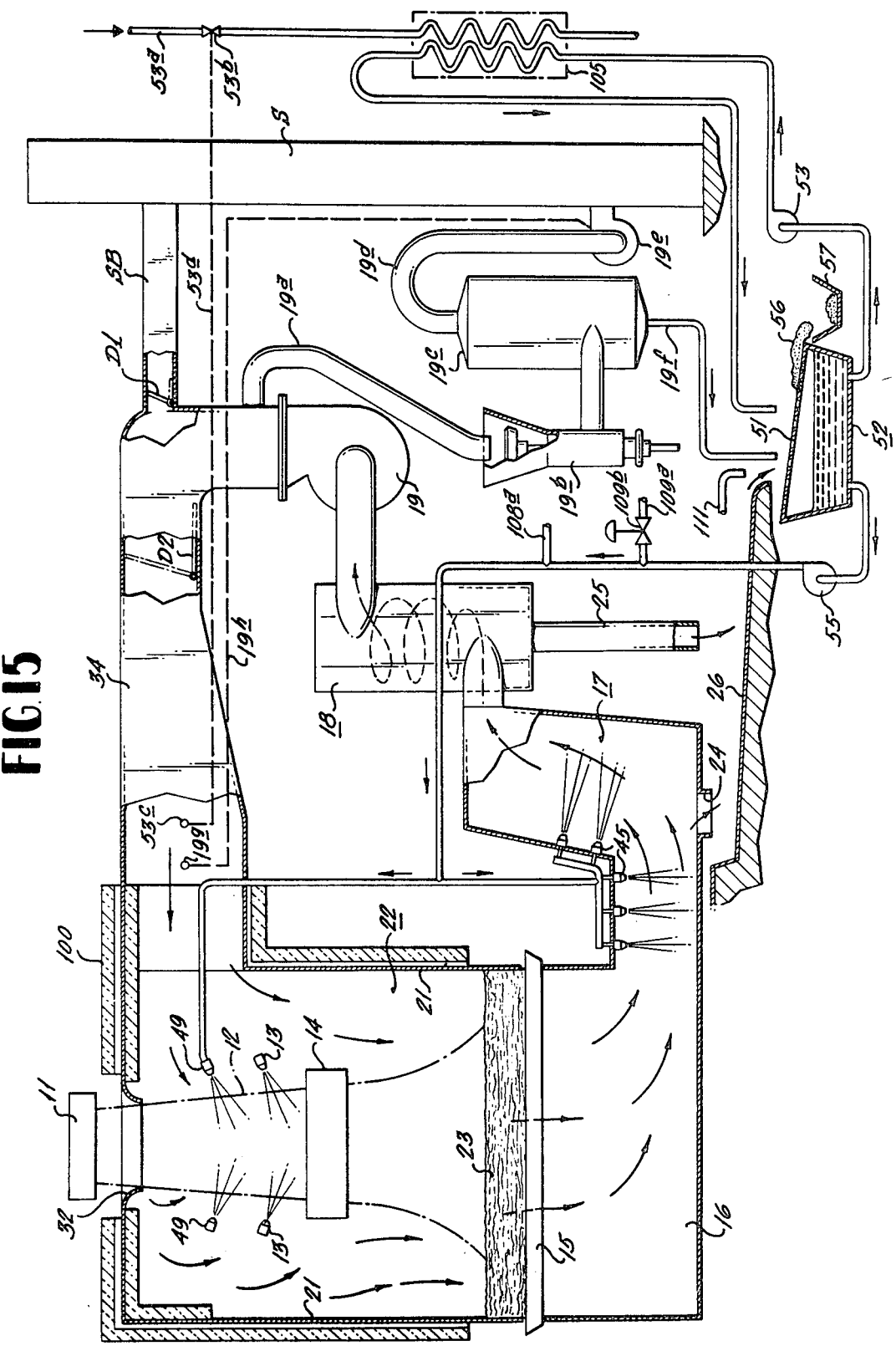
FIG. 15 is a schematic view of a fiber production installation having certain equipment associated therewith for suppression of pollutants in the manner illustrated in various of the figures above referred to, and further illustrating one embodiment of pressure and temperature controls according to the present invention.

In considering the controls, attention is first directed to FIG. 15 in which there is diagrammatically represented a fiber production and collection installation including a fiber production device indicated at 11. As brought out above, this may take a variety of forms, such as a centrifuge, for instance as shown in the Levecque U.S. Pat. No. 3,285,723. It may also take the form of various other fiberization techniques, such as that disclosed in U.S. Pat. No. 3,874,886, above referred to. In either event, and also in the event of using still other techniques for fiberization, the technique includes employment of attenuating gases which carry the attenuating and attenuated fibers downwardly into and through the chamber or forming section 22 which is defined by the enclosing walls 21, the current of the attenuating gas and fibers being indicated in the FIG. 15 at 12. Although in FIG. 15 the fiber production device 11 is shown at the top and the collection device at the bottom, other relationships may be employed.

Although the fiber forming equipment may be located within the chamber 22, as shown in FIG. 15 it is located just above the top wall 100 and delivers the current of the attenuating gas and the fibers downwardly into the chamber. If desired a centrally apertured closure 32 may be arranged around the current entering the chamber.

At the bottom of the chamber 22 a foraminous collecting device diagrammatically indicated at 15 is provided, this collecting device advantageously taking the form of a perforated endless conveyor on which the fibers are deposited, so as to build up a mat as indicated at 23, which is carried by the conveyor out of the zone of the forming section, as is well understood in this art. A fiber distributing device diagrammatically indicated at 14 may also be employed to assist in laying down a uniform blanket upon the conveyor 15.

As is indicated by arrows applied to FIG. 15, the attenuating blast entrains air or gases and the resultant current passes downwardly through the foraminous collecting device 15 and into the suction chamber indicated at 16. A suction fan 19 serves to provide forced circulation of the gas, and assists in establishing the current downwardly in the forming section so as to deposit the fibers on the collecting device 15 and draw the gas through this device and through the the washing chamber indicated at 17 and the cyclone separator 18. The exhaust or suction fan delivers the gases into the duct 34 which, as clearly appears in FIG. 15, is connected with the upper portion of the forming section or chamber 22, in the region in which the fibers are being introduced or attenuated. A recirculation of the gases is thus provided in the manner fully described above. Moreover, as already described, a water spray, originating from nozzles 49 may be applied to the current in the upper portion of the forming section, and, in addition, a binder may be sprayed upon the current, for instance by nozzles indicated at 13.

The gases being drawn downwardly through the forming section, through the blanket 23 and the perforated collecting device 15, entrain substantial quantities of water and pollutants, and in order to remove pollutants in the recirculating flow is subjected to a washing action by water spray nozzles indicated at 45, as the gases pass into the scrubber 17. Some of the water and pollutants will then drain or flow by gravity through the opening indicated at 24 into a collection or draining system 26 and ultimately into a sump 52. Droplets of moisture and pollutants which are not separated at this point flow with the recirculating gas into the cyclone separator 18, in which moisture droplets are separated and flow downwardly by gravity through the discharge 25 and then join the liquid in the sump 52. After separation of the liquids in this manner the gases are returned to the forming chamber as above described.

The water entering the sump 52 from the collecting system 26, is subjected to a screening operation by means of the screen diagrammatically indicated at 51 thereby straining out various solids, as indicated at 56, which solids may be received in the trough 57 for subsequent disposal, for instance after processing in the manner referred to above. The liquid in the sump 52 is desirably cooled, for instance in the indirect heat transfer device indicated at 105, the liquid being delivered by the pump 53 through this heat transfer device, in heat exchange relation to a cooling liquid from the supply pipe 53a, for instance a normal water supply pipe. The cooled liquid is then returned to the sump 52.

Liquids may be withdrawn from the sump 52 by means of the pump 55 and delivered to the spray nozzles 49 and 45, as shown in FIG. 15, and if desired some water may be diverted through connection 108a and used in the formulation of additional aqueous binder spray material to be sprayed upon the fibers by nozzles 13, in the manner already explained.

Recirculating wash water which is sprayed upon the current of attenuating gases and fibers through the nozzles 49 will be subjected to considerable elevation in temperature, in consequence of which soluble organic constituents carried in the wash water will be in part insolubilized, so that upon subsequent passage of this water through the filtration and separation equipment, such as diagrammatically indicated at 51, some separation of additional solids will occur. More extensive insolubilization of the pollutant organic constituents in the wash water may be effected by diverting a portion of the wash water from the recirculation flow path beyond the pump 55, as by means of the branch 109a, having a valve 109b, to insolubilization systems such as shown in FIGS. 7 and 8.

In the embodiment shown in FIG. 15, offtake 19a is provided for diverting and discharging a portion of the recirculating gases. This offtake delivers the diverted gases through a venturi separator of known type including adjustable venturi device 19b for increasing the velocity of the gases, and the separator 19c, from which the gases are withdrawn at the top through the connection 19d under the influence of the blower 19e which discharges into the stack S. The additional liquids separated in the separator 19c are delivered through a connection 19f back to the sump 52.

In the embodiment of FIG. 15 a bypass SB is also provided from the downstream side of the suction or circulating fan 19 to the stack, and this bypass desirably has a normally closed damper D1 therein. Similarly a normally open damper D2 is provided in the recirculation duct downstream of the point of connection of the bypass SB. The dampers D1 and D2 are provided for the purpose of bypassing the gas flow to the stack for instance in the event of a malfunction in the venturi separator equipment which is contemplated for normal use in this embodiment.

For pressure control in the embodiment of FIG. 15, it is contemplated to employ a pressure sensor 19g in the recirculation flow path close to or in the forming section, this sensor being provided with a control connection diagrammatically indicated at 19h which is extended from the sensor to the motor for driving the blower 19e. When the pressure device 19g senses increase in the pressure, the control system operates to increase the speed of operation of the motor for the blower 19e, thereby resulting in diverting and discharging a larger percentage of the recirculating gases. It is contemplated and preferred that this pressure sensor and the associated control system operate to maintain the pressure in the forming section substantially at atmospheric pressure, thereby avoiding tendency for substantial leakage of gases from or into the forming section, notwithstanding the operation of the recirculation system. In a system of the kind illustrated and described, the quantity of gases diverted and discharged will ordinarily approximate about 15% of the total of the gases entering the suction chamber 16, and in a typical installation the attenuating gases introduced by the fiber forming equipment and leaking into the suction chamber 16 also represent about 15% of the total gases flowing through the system.

The offtake 19a could be directly connected to the blower 19e, without the interposition of the venturi separator 19b–19c, and the pressure control system would still function in the manner described, but it is preferred to use a separator in this offtake in order to supplement the separation of pollutants effected by the scrubbing of the gas in the scrubber 17 and the separation of entrained moisture in the separator 18. Turning now to the matter of temperature control, attention is first called to the fact that a valve 53b is provided in the cooling water supply line 53a. This valve is placed under the control of a temperature sensor 53c which is also positioned in the recirculation flow path near to or in the upper portion of the forming section 22. This sensor has a control connection indicated diagrammatically at 53d which is extended to and connected with the water supply valve 53b. The sense of this control is to increase the valve opening with increase in temperature in the recirculating gases and decrease the valve opening with decrease in temperature. By this system of control, the temperature of the water in the sump 52 is maintained substantially constant, so that the water used for spraying and scrubbing the gases in the scrubber 17, i.e., the water delivered to the spray nozzles 45, is also maintained substantially constant. This control of the water temperature will in turn control the temperature of the recirculating gases and, when operation of the system is established and stabilized, deviation of temperature of the recirculating gases from a predetermined median value will result in a compensating change in the temperature of the water used for scrubbing the gases, thereby compensating for gas temperature fluctuation.

The arrangement of FIG. 15 thus provides for both temperature and pressure control, and thereby assures maintenance of uniform operating conditions in the zone of fiberization and blanket formation in the forming section.

It is contemplated that the controls be established in a manner maintaining a pressure within the forming section very close to atmospheric pressure. Thus, the pressure sensor and the control system for adjusting the speed of operation of the blower or fan 19e will operate to divert and discharge that quantity of the total recirculating gases which is represented by newly introduced attenuating gases and leakage of air. For accurate maintenance of the desired pressure, the offtake for diverting and discharging a portion of the gases from the recirculation flow path is desirably connected with the ducting downstream of the suction fan or blower 19, but upstream of the forming section. Maintenance of the pressure in the forming section at atmospheric pressure is desirable in order to avoid leakage of gases from the forming section into the surrounding atmosphere, and also to avoid leakage of air into the forming section.

Figure 16:
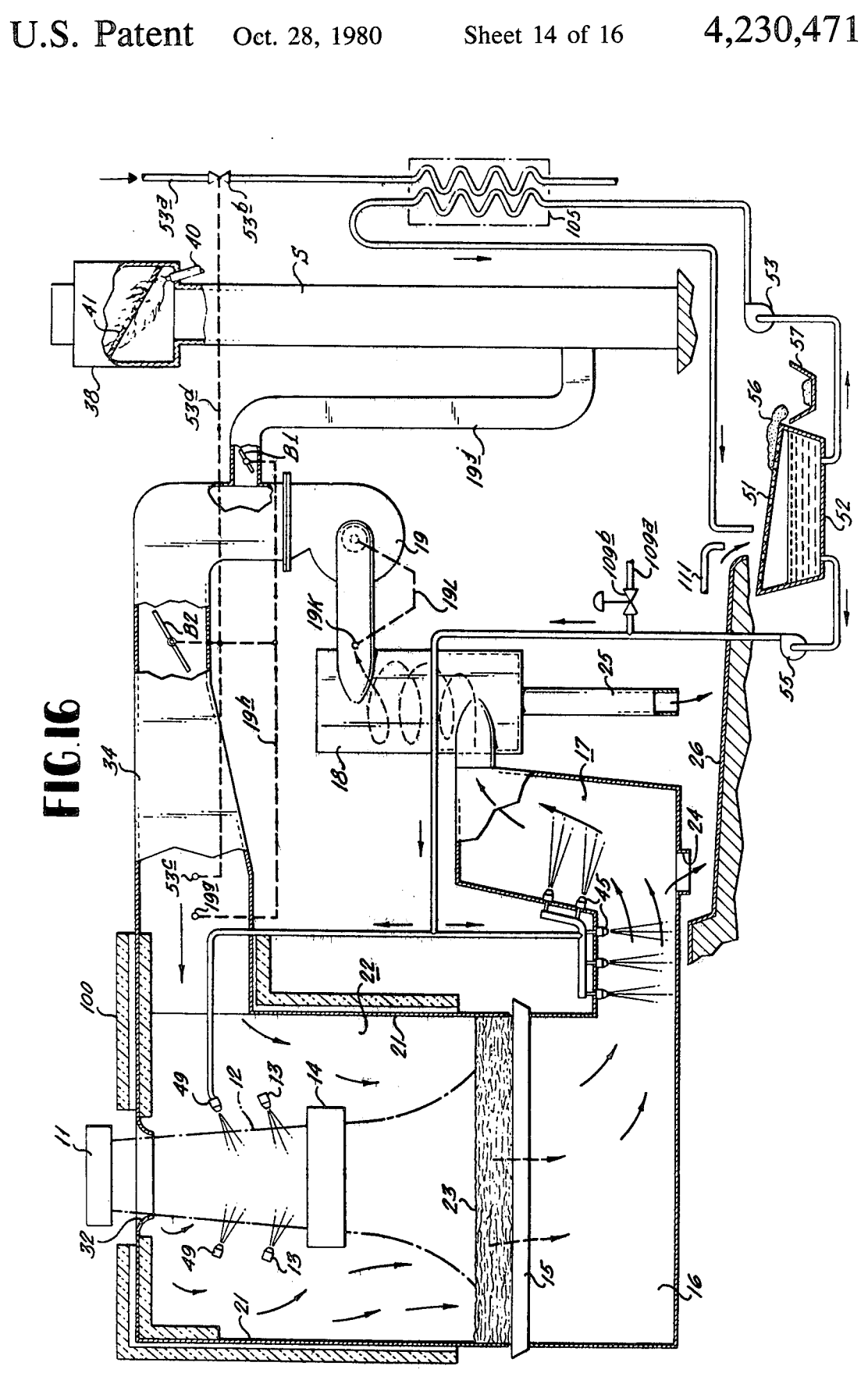

Turning now to the embodiment illustrated in FIG. 16, it is first noted that the forming section and associated devices are illustrated in the same manner as in FIG. 15, and that the various parts are identified by the same reference numerals. Moreover, the embodiment of FIG. 16 illustrates the same temperature control system, including the indirect heat exchanger 105, the cooling water supply line 53a, and the supply controlling valve 53b which is operated under the influence of the temperature sensor 53c.

However, the pressure control system shown in FIG. 16 is different from that shown in FIG. 15. In FIG. 16 an offtake 19j is connected with the recirculation flow path at a point between the fan 19 and the forming section, and this offtake 19j is directly connected with the stack S. The offtake 19j is provided with a control valve, for instance a butterfly type of valve indicated at B1. In addition a similar butterfly control valve B2 is located in the ducting 34 extended from the blower 19 to the forming section.

The two butterfly control valves B1 and B2 are both controlled by the pressure sensor 19g, a control connection being provided as diagrammatically indicated at 19h. The control valve B1, being located in the offtake 19j, regulates the quantity of the gases diverted from the recirculation flow path. However, accuracy of pressure control in the forming section requires also that the butterfly control valve B2 in the ducting be operated simultaneously with the valve B1. The manner of operation of these valves under the influence of the sensor 19g is as follows. When the sensor 19g experiences an increase in pressure, the position of the valve B2 is shifted to decrease the opening for the recirculating gases, and at the same time the position of the valve B1 is adjusted to increase its opening. This results in tendency to equalize or stabilize the pressure of the recirculating gases in or entering the forming section. Although, for maximum accuracy of pressure control, it is preferred to use both of valves B1 and B2, it is also possible to approximate the desired control by employment of valve B2 only.

In the embodiment of FIG. 16, instead of employing a separator of the type indicated at 19b and 19c in FIG. 15, the offtake 19j is connected directly to the stack S, as noted above. Where pollution restrictions are particularly stringent, a system such as shown in FIG. 16 preferably further embodies a burner device indicated diagrammatically at 38, this device being provided with a burner 40 supplied with a combustible mixture and provided with a grid 41 or any other suitable flame stabilization device. The portion of the gases or fumes diverted and discharged are passed through this burner device 38 and are subjected to high temperature, preferably between about 600° and 700° C., to thereby burn any organic constituents remaining before discharge of the diverted gases to atmosphere. A temperature of from about 300° to 400° C. may be used in the presence of a combustion catalyst.

The employment of the burner 38 in a system such as diagrammatically illustrated in FIG. 16 is effective to reduce the pollutants in the discharged gases to a very low value.

In FIG. 16 there is also disclosed a control for the flow or volume of the gases in the recirculation system. Thus, a flow sensor 19K is arranged in the connection between the separator 18 and the suction fan 19, and this sensor is connected as indicated at 19L with the motor for the suction fan 19. The sensor is connected with the motor in a manner to provide for decrease in the motor speed when the sensor experiences an increase in the flow, and for an increase in motor speed when the sensor experiences a decrease in flow. Although this flow control may not always be required, it will serve to further stabilize the operating conditions in the forming section.

Figure 17:
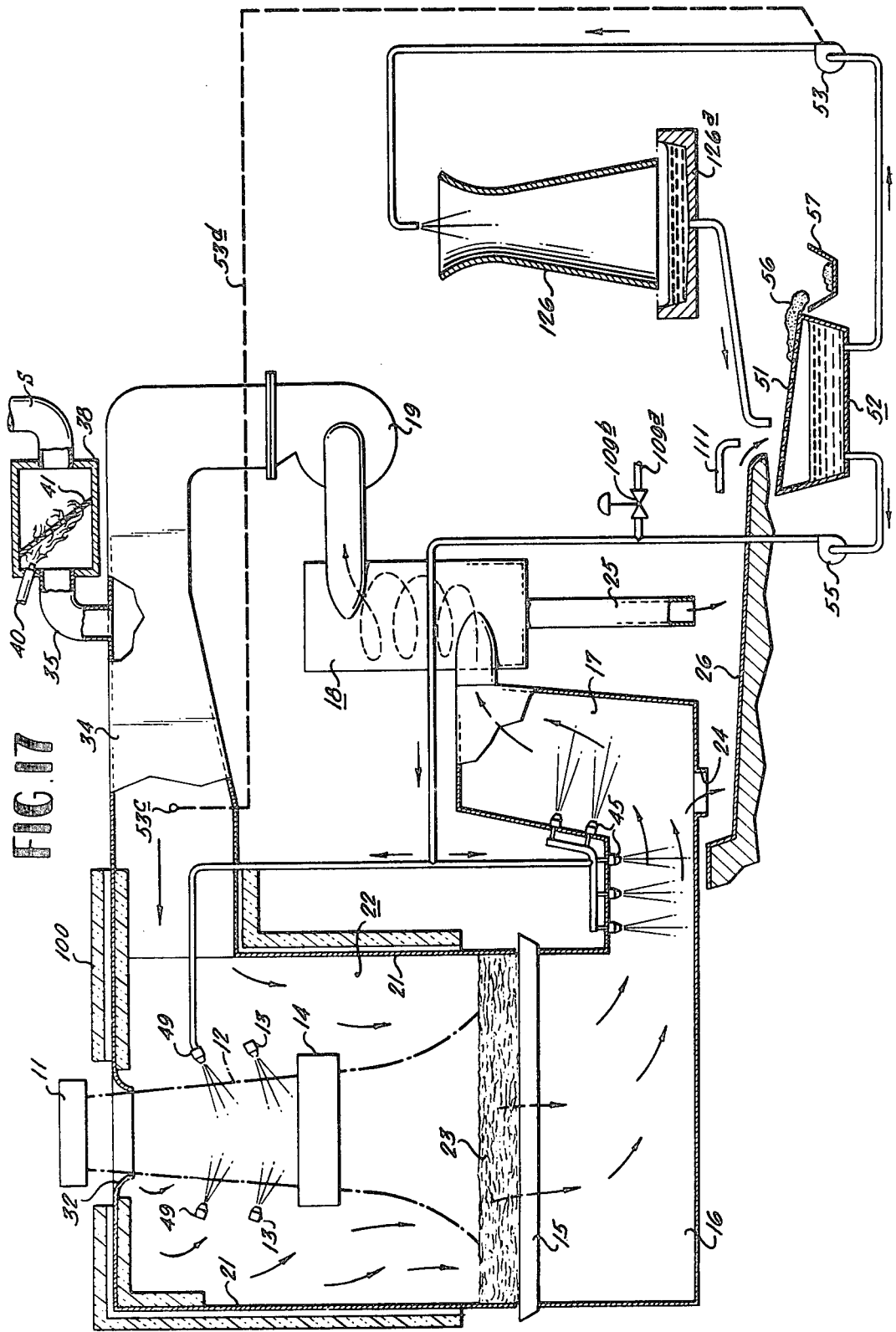
FIG. 17 is a view similar to FIG. 1 but illustrating another embodiment of the temperature control system.

Turning now to the embodiment illustrated in FIG. 17, it is noted that here again the portion of the system comprising the forming section and associated parts are the same as those described above in connection with FIGS. 15 and 16.

In the system of FIG. 17, however, there is disclosed an alternative arrangement for cooling the water used to spray and cool the recirculating gases. In this embodiment a spray cooling tower 126 is utilized for cooling the water circulated through the sump 52. The water is withdrawn from the bottom of the sump by the pump 53 which delivers the water through a spray nozzle into the cooling device 126 for direct heat transfer to the air. The water is collected at the bottom of the tower as at 126a, and is then returned to the sump 52 as indicated. In this arrangement the temperature is controlled by a sensor 53c having control connections 53d extended to the motor for the pump 53, thereby regulating circulation of the water through the spray tower 126. When the temperature sensor 53c experiences a drop in temperature below the desired median value, the speed of the pump 53 is reduced, thereby diminishing the water cooling effect of the tower 126. In consequence of this the water sprays 45 and 49 will deliver water at a somewhat higher temperature and will therefore not cool the recirculating gases to the same extent.

This embodiment provides an exceedingly simple temperature regulation system and may be used in installations where the quantity of pollutants remaining in the filtered water in the sump 52 is not very high, and will therefore not result in any extensive atmospheric pollution as a result of spraying the water in the tower 126. The system of FIG. 17 also incorporates an offtake 35 for diverting and discharging a portion of the recirculating gases. As here shown the offtake is provided with a burner device 38 of arrangement similar to that described above in connection with FIG. 16.

As will be understood, a system such as shown in FIG. 17 may also incorporate a pressure control system, for instance a system as disclosed in FIG. 15 or FIG. 16, and described above.

Likewise, although the apparatus in FIGS. 15 and 16 includes systems for both pressure and temperature control according to the invention, either one of these systems may be used alone.

Figure 18:
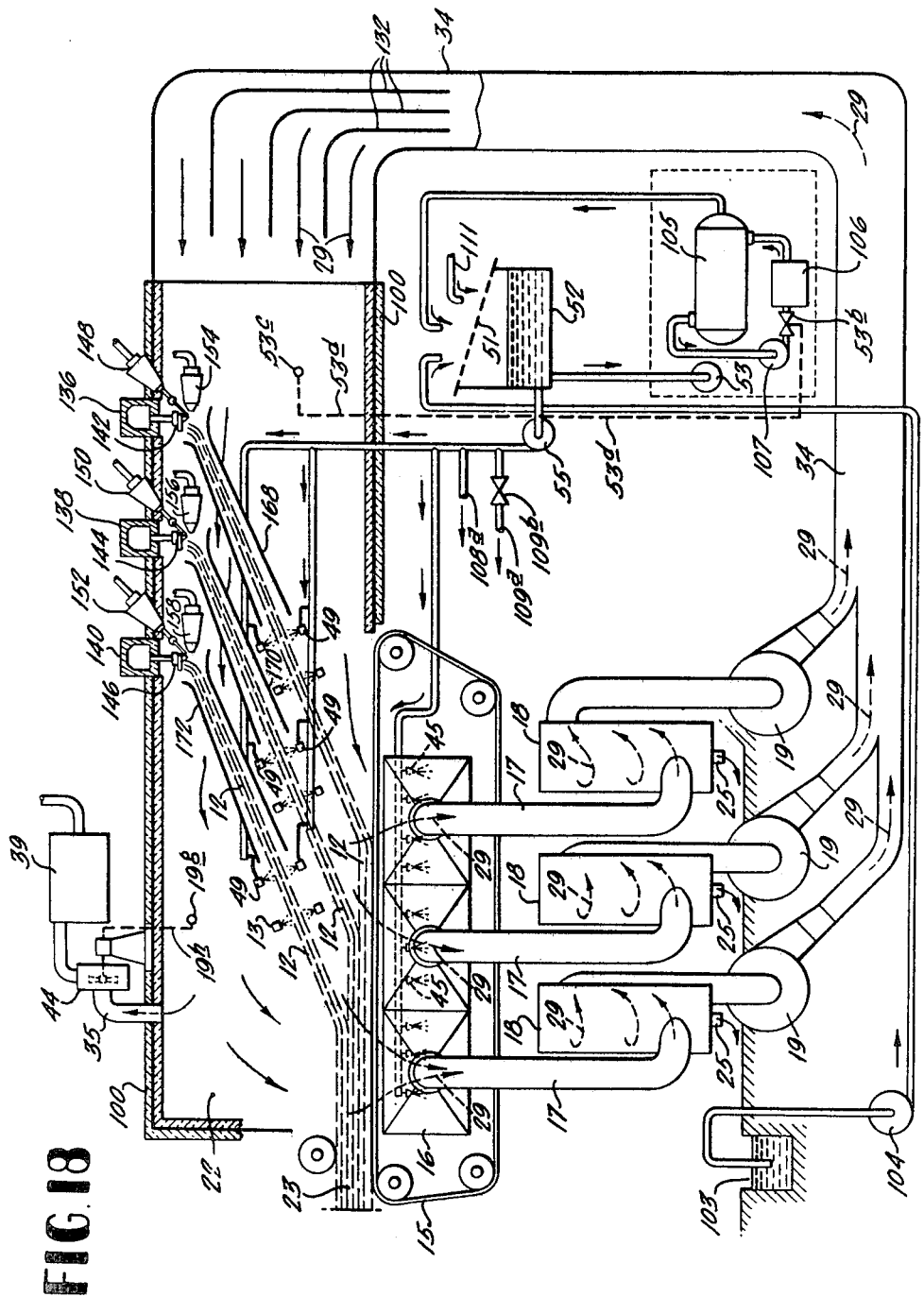

In the embodiment of FIG. 18, the forming section and various other parts shown in the preceding figures bear the same reference characters. FIG. 18 shows a fiberization installation similar to that described in application Ser. No. 557,281 above referred to, comprising principal gaseous current or blast generators 154, 156 and 158 and also secondary or carrier jet generators 148, 150 and 152 placed in a forming section 22.

As described in U.S. Pat. No. 3,874,886, also above referred to, each secondary gaseous jet, by penetrating the principal current, creates a zone of interaction into which is led a stream of thermoplastic material such as molten glass, thereby effecting attenuation of the glass by the process known as toration. The glass is supplied from the orifices in the bushings 142, 144 and 146, fed by the forehearths 136, 138 and 140.

It is preferable to use in combination with each principal current a plurality of secondary jets and a plurality of glass streams are led into each principal current, each being associated with a secondary jet, which provides groups of fiberization centers for each principal current generator. The fiberization centers formed by the various groups of generators deliver attenuated fibers into a guide 168, 170 or 172. The guides comprise channels directing the fibers downwardly, with relation to the fiberization zone, delivering the fibers onto the foraminous blanket forming device or conveyor 15 which is located at the bottom of forming section 22. The gases delivered from the blast generators and from the secondary jets flow with the fibers into the guides and form with the fluids which they induce the currents of gas and fibers illustrated at 12.

The suction chambers 16 placed under the perforated conveyor 15 provide for lay down of the fibers in the conveyor. These suction chambers communicate with the cyclone separators 18 each connected to an exhaust fan 19 which drives the gases into the recycling duct 34 as described in connection with the preceding figures. This duct comprises a portion of the gas recycling path; it is connected to an end of the fiber forming chamber 22, and with guiding partitions 132 provides uniform distribution of the recycled gases in the said chamber.

The gases and fibers are cooled as soon as they leave the guides 168, 170 and 172 by water delivered from nozzles or sprayers 49 preferably arranged both above and below the currents 12 of the attenuated fibers and the gases. The spraying nozzles 13 are used for spraying the binder, the nozzles 13 being located downstream of the nozzles 49.

As specified above, the gases entering the suction chambers contain resinous components from the binder, and moisture and small debris from fibers, and these constituents are extracted from the gases in the cyclone separators 18. This separation is enhanced by the previous washing of the gases by the water sprayers 45 placed inside the suction chambers 16. The water and the polluting elements discharged through the tubes 25 accumulate in the sump 103. After this separation the gases are recycled to the forming section or chamber 22.

The general flow of the gases in the recycling path is illustrated by the arrows 29. In the forming section 22 the gaseous flow is established primarily by the evacuation fans 19 but is reinforced by the action of the principal current or blast and of the carrier jets in the fiberization centers. A portion of the recycled gases enters the upper ends of the guides and other portions are led toward the gas and fiber currents 12 beyond the discharge ends of the guides.

The water and the polluting elements recovered in the sump 103 are delivered by pump 104 and to the sump 52 which is provided with a filter or sieve 51. The gathered liquid in the sump is sent by means of the pump 53 through the heat exchanger 105 to be cooled. The heat exchange is effected in two stages by means of a fluid of heat carrier which circulates by pump 107 through the cooling system 126. This is comprised, for example, of a cooling tower in which water from a normal water supply source is circulated by the pump 107 and is brought into contact with the atmospheric air. The cooled liquid in the exchanger 105 is then sent to the pump 52.

The liquid withdrawn from the sump 52 by the pump 55 can be reused as already pointed out in the description relating to FIG. 15 and the withdrawn portion is eventually submitted to the insolubilization treatment of the polluting organic constituents.

Make-up water can be introduced into the system by way of the feed connection 111 delivering to the sump 52.

A discharge duct 35 extended from the upper part of the forming section or chamber is used to discharge a portion of the gases from the said chamber under the influence of the fan 44. The gases thus emitted are led into a burning apparatus 39 in which the temperature is raised, as described for FIGS. 16 and 17, preferably to a value at least equal to 600° C. Here again, the quantity of gases directed and treated in the burning apparatus can be about 5% of the total quantity of gas flowing through the perforated conveyor 15.

The pressure control in this installation is effected by a pressure sensor 19g placed in the formation chamber and connected to the operating motor for the fan 44 by means of the control connection schematically illustrated at 19h. The operation of this system is similar to that described for FIG. 15. When the pressure sensor 19g detects a rise in pressure, the control system effects an increase of the speed of the fan 44, which increases the quantity of gas discharged through the duct 35.

For temperature control a valve 53b is used, placed in the path in which the cooling fluid circulates through the cooling system 126.

The valve 53b is connected, by means of a control connection schematically illustrated at 53d, to a temperature sensor 53c placed in the forming chamber 22, preferably in its upper part. When the temperature sensor detects an increase in temperature of the gases in the forming chamber, the regulation system effects opening of the valve 53b, which initiates an increase of the circulation of the heat carrier liquid and increases the cooling action in the heat exchanger 105, and conversely when the temperature decreases in the forming chamber the cooling action is diminished. This temperature control of the water coming from the sump 52 and sprayed by the sprayer nozzles 45 and 49 controls in turn the temperature of the recycled gases and consequently that of the forming section or chamber.

The pressure and temperature control devices illustrated in FIGS. 15 and 16 as well as the discharge duct 19a or 19j for the non-recycled gases, and various of the separation devices such as electrofilters, can be used in the same general way in the installation shown in FIG. 18, instead of offtake 35.

As hereinabove mentioned, the recirculating wash water is desirably subjected to further purification, especially by treatment of the wash water at elevated temperature in order to convert water soluble pollutant constituents to an insoluble form. This is desirably accomplished either batch-wise or continuously and in either event the treatment may be carried out in a manner to withdraw a portion only of the water from the recirculation flow path and then return the treated portion to the sump 52. A continuous system for this purpose is illustrated diagrammatically in FIG. 8. In the bottom central portion of that figure an inlet connection is indicated, having a pump 77, and the connection 109a of FIG. 15, 16, 17 or 18 may be connected with the inlet shown in FIG. 8. Alternatively, the batch type system of FIG. 7 may be employed for the insolubilization.

EXAMPLES

Glass fibers were made in accordance with the techniques illustrated in FIG. 15.

Water was sprayed on the fibers through nozzles 49 and binder resin material was sprayed on the fibers through nozzles 13.

The binder resin material was a 10% aqueous solution of the following (solids indicated by weight parts):

| | |
|---|---|
| Phenol formaldehyde (water soluble resol type) | 50 |
| Urea | 40 |
| Emulsified Mineral oil | 7 |
| Ammonium sulphate | 3 |

In spraying the binder material on the fibers, the binder material was subjected to a temperature of about 300° C., resulting in volatilization of some constituents of the binder material. Such volatilized constituents were entrained by the circulating gases and were washed from the gases by the wash water in which these constituents were suspended or dissolved.

The wash water was found to contain 2.5% of solids. Of these solids about 0.02% was represented chiefly by broken fibers and already insolubilized binder resin; and about 2.3% was represented by soluble constituents of the binder resin material, chiefly phenol (1.5%) and formaldehyde (0.4%).

The soluble constituents just mentioned were subjected to insolubilization by treatment at elevated temperature, in the general manner described above with reference to FIG. 8. Thus, a temperature of about 200° C. was maintained for an interval of a few minutes and the water was then cooled. After this treatment about 70% of the soluble constituents were insolubilized. The insolubilized constituents were then filtered from the water.

In consequence of the treatment of this example, the solids content of the wash water was brought down to about 0.07%, which is satisfactory for reuse in the system.

After separation of the wash water, most of the gases were recirculated to the fiberization zone. However, a portion of the gases were withdrawn from the recirculation path and in accordance with FIG. 15 were passed through a venturi separator and were discharged to the stack. The gases delivered to the venturi separator contained a residual quantity of the pollutants and the venturi separator removed from about 60% to 70% of the residual pollutants before discharge of the gases from the stack.

In another example, the operation was carried out in the same manner as described above, but instead of delivering the withdrawn gases through the venturi separator, the withdrawn gases were delivered through a burner chamber prior to discharge from the stack in the manner as illustrated in FIG. 16. In this case, the efficiency of the burner was close to 100%, i.e., it eliminated virtually all of the pollutants from the gas discharged to the atmosphere.

Numerous other fiber binders including melamine formaldehyde, urea formaldehyde, dicyandiamide formaldehyde resins and also bitumen, are useable in techniques as described in the example above.

We claim:

1. Equipment for the manufacture of fibers by gas blast attenuation of thermoplastic material comprising a forming chamber or section having a foraminous fiber collecting device at a boundary thereof and having an inlet for a current of the attenuating gas and the attenuated fibers in a region remote from said collecting device and directed in a path toward said device, a suction chamber downstream of said device, means for spraying an aqueous liquid binder composition on the current of the attenuating gas and the attenuated fibers in the forming section, means for spraying water on the current of gas and fibers in the forming section, a suction fan connected to withdraw gas from the suction chamber, means for separating entrained water from the gas withdrawn from the suction chamber, means for recirculating the withdrawn and washed gas into the forming section in a path directed transversely toward the current of attenuating gas and attenuated fibers in a region in said path toward the collecting device, a tubular element surrounding said current in said region of the path of the recirculating gases, means for separating binder components from such separated water, and means for recirculating the water to at least one of said spraying means.

2. Equipment as defined in claim 1 in which the means for spraying water on the current of gas and fibers in the forming section is arranged to spray the water on the current upstream of the binder spray means but downstream of said tubular element.

3. Apparatus for forming fibrous mats from thermoplastic mineral material comprising a chamber having a perforated fiber collecting conveyor at the bottom, gas blast fiber attenuation means in the region of the top of the chamber arranged to direct a fiber-laden gaseous current in a path in the chamber extended downwardly toward the fiber collecting conveyor, suction means below the conveyor for drawing gases through the conveyor and thereby building up a mat of fibers on the conveyor, gas circulating ducting receiving the gases from the suction means, the ducting being arranged to deliver the circulating gases laterally into the chamber in a region in said path directed transversely toward the downwardly directed fiber-laden gaseous current, and a tubular shield surrounding the downwardly directed current in said region of the transversely directed path of the recirculating gases.

* * * * *

UNITED STATES PATENT AND TRADEMARK OFFICE
CERTIFICATE OF CORRECTION

PATENT NO. : 4,230,471
DATED : October 28, 1980
INVENTOR(S) : Marcel Levecque & Jean A. Battigelli It is certified that error appears in the above—identified patent and that said Letters Patent are hereby corrected as shown below:

Column 10, line 6 - "gears" should read --gases;

line 11 - "halt" should read --belt--.

Column 14, line 22 - "fine" should read --flue--.

Column 26, line 5 - "circuit" should read --current--.

Column 27, line 3 - "of" (2nd occurrence) should read --or--;

line 50 - "stream" should read --steam--.

Column 28, line 54 - after "ants", delete "in".

Column 35, line 25 - "0.02%" should read --.2%--;

line 41 - "0.07%" should read --.7%--.

Signed and Sealed this

Thirty-first Day of March 1981

[SEAL]

Attest:

RENE D. TEGTMEYER

Attesting Officer    Acting Commissioner of Patents and Trademarks

UNITED STATES PATENT AND TRADEMARK OFFICE
CERTIFICATE OF CORRECTION

PATENT NO. : 4,230,471
DATED : October 28, 1980
INVENTOR(S) : Marcel Levecque & Jean A. Battigelli It is certified that error appears in the above-identified patent and that said Letters Patent are hereby corrected as shown below:

Column 10, line 6 - "gears" should read --gases;

line 11 - "halt" should read --belt--.

Column 14, line 22 - "fine" should read --flue--.

Column 26, line 5 - "circuit" should read --current--.

Column 27, line 3 - "of" (2nd occurrence) should read --or--;

line 50 - "stream" should read --steam--.

Column 28, line 54 - after "ants", delete "in".

Column 35, line 25 - "0.02%" should read --.2%--;

line 41 - "0.07%" should read --.7%--.

Signed and Sealed this

Thirty-first Day of March 1981

[SEAL]

Attest:

RENE D. TEGTMEYER

Attesting Officer    Acting Commissioner of Patents and Trademarks